(12) United States Patent
Alacoque

(10) Patent No.: US 7,800,330 B2
(45) Date of Patent: Sep. 21, 2010

(54) METHOD FOR REGULATING A VOLTAGE OR A CURRENT OF AN RLC FILTER, A RECORDING MEDIUM AND VEHICLES FOR THIS METHOD

(75) Inventor: Jean Alacoque, Communay (FR)

(73) Assignee: Alstom Transport SA, Levallois-Perret (FR)

( * ) Notice: Subject to any disclaimer, the term of this patent is extended or adjusted under 35 U.S.C. 154(b) by 323 days.

(21) Appl. No.: 12/154,498

(22) Filed: May 23, 2008

(65) Prior Publication Data

US 2008/0291705 A1 Nov. 27, 2008

(30) Foreign Application Priority Data

May 25, 2007 (FR) .................................... 07 03719

(51) Int. Cl.
*H02M 1/14* (2006.01)
*H02J 3/36* (2006.01)

(52) U.S. Cl. ...................... 318/434; 318/560; 318/812; 363/39; 363/47

(58) Field of Classification Search ................ 318/560, 318/561, 600, 636, 430–434, 801, 807–812, 318/400.11, 400.22, 400.23, 400.24, 400.3, 318/782; 363/34, 35, 39, 40, 45, 47
See application file for complete search history.

(56) References Cited

U.S. PATENT DOCUMENTS

| 4,894,599 A * | 1/1990 | Ottesen et al. ............... 318/636 |
| 7,298,112 B2 * | 11/2007 | Alacoque .................... 318/811 |
| 7,459,893 B2 * | 12/2008 | Jacobs ......................... 323/282 |
| 2002/0008982 A1 * | 1/2002 | Jiang-Hafner ................ 363/148 |
| 2005/0143846 A1 * | 6/2005 | Kocher et al. .................. 700/34 |
| 2008/0012544 A1 * | 1/2008 | Krein et al. .................... 323/282 |
| 2008/0239770 A1 * | 10/2008 | Punzet et al. ................... 363/40 |
| 2010/0007304 A1 * | 1/2010 | Hammel et al. ............. 318/778 |

FOREIGN PATENT DOCUMENTS

| JP | 60 059904 | 4/1985 |
| JP | 63220764 A * | 9/1988 |
| JP | 2005 318683 | 11/2005 |

OTHER PUBLICATIONS

Takao Kawababa et.al., "Dead Beat Control of Three Phase PWM Inverter", IEEE Transactions of Power Electronics, vol. 5, No. 1, Jan. 1990, pp. 21-28, ISSN 0885-8993.

(Continued)

*Primary Examiner*—Bentsu Ro
*Assistant Examiner*—Eduardo Colon
(74) *Attorney, Agent, or Firm*—Davidson, Davidson & Kappel, LLC

(57) ABSTRACT

This deadbeat control method for regulating an output voltage $U_c$ or an output current $I_l$ of a low-pass RLC filter includes:
- calculation (92) of a current setting $\bar{I}_{uc}$ for the average intensity $\bar{I}_u$ of a DC current $I_u$ flowing through a first output point of the filter between instants $t_i$ and $t_{i+1}$, this setting $\bar{I}_{uc}$ being established from discretized state equations of the filter in such a way that the voltage $U_c$ or the line current $I_l$ is equal to a predetermined setting of voltage $U_{cc}$ or of line current $I_{lc}$ at the instant $t_{i+1}$,
- control (100) of an electric converter in order to produce a current $I_u$ flowing through the filter, the average intensity $\bar{I}_u$ of which between the instants $t_i$ and $t_{i+1}$ is equal to the current setting $\bar{I}_{uc}$.

16 Claims, 5 Drawing Sheets

OTHER PUBLICATIONS

Kojima M et.al., "Novel Vector Control System Using Deadbeat-Controlled PWM Inverter with Output LC Filter", IEEE Transactions on Industry Applications, vol. 40, No. 1, Jan. 2004, pp. 162-169, ISSN 0093-9994.

* cited by examiner

METHOD FOR REGULATING A VOLTAGE OR A CURRENT OF AN RLC FILTER, A RECORDING MEDIUM AND VEHICLES FOR THIS METHOD

This application claims priority French application FR 07 03719, filed on May 25, 2007, the entire disclosure of which is incorporated by reference herein.

The present invention relates to a method for regulating a voltage or a current of an RLC filter, a recording medium and vehicles for this method.

BACKGROUND OF THE INVENTION

More specifically, the applicant is aware of methods for regulating a voltage $U_c$ between a first and a second output point of a low-pass RLC filter of natural period $T_f$, this RLC filter including two input points electrically connected, respectively, to the conductors of a DC bus of an electric vehicle powered via a catenary, the first and the second output points being electrically connected to a controllable electric converter for controlling the torque exerted by an electric traction motor of the electric vehicle, the stator time constant $\tau$ of this motor being strictly less than the natural period $T_f$.

These regulation methods include the measurement or estimate of the intensity $I_{li}$ of a line current $I_l$ flowing through the inductance of the filter at an instant $t_i$, of the voltage $U_{ci}$ between the output points of the filter at the instant $t_i$, and of a line voltage $U_l$ between the input points of the filter.

The applicant is also aware of methods for regulating a line current $I_l$ flowing through an inductance L of a low-pass RLC filter of natural period $T_f$, this filter including:

two input points electrically connected, respectively, to the conductors of a DC bus of an electric vehicle powered via a catenary, and first and second output points, the first and the second output points being electrically connected to a controllable electric converter in order to cause the torque of an electric traction motor of the electric vehicle to vary, the stator time constant $\tau$ of this electric motor being strictly less than the natural period $T_f$.

These methods include the measurement or estimate of the intensity $I_{li}$ of the line current $I_l$ at an instant $t_i$, of a voltage $U_{ci}$ between the output points of the filter at the instant $t_i$ and of a line voltage $U_l$ between the input points of the filter.

Here, the term "catenary" refers to both an overhead line against which a pantograph rubs in order to power the electric vehicle and a ground-based rail against which a contact shoe slides in order to power an electric vehicle. This ground-based rail is more often known by the term "third rail".

The stator time constant $\tau$ of an electric motor is defined by the following relationship:

$$\tau = \frac{L_m}{R_m}$$

where:
$L_m$ is the stator inductance of the electric motor, and
$R_m$ is the stator resistance of the electric motor.

This time constant is typically between 4 ms and 200 ms for the electric traction motors of an electric vehicle.

The natural period $T_f$ of the RLC filter is defined by the following formula:

$$T_f = 2\pi\sqrt{LC}$$

This natural period $T_f$ must be strictly greater than the time constant $\tau$ of the motor, otherwise the RLC filter cannot fulfil its function as a low-pass filter in relation to rapid variations in the current consumed or produced by the motor. Another purpose of the RLC filter is to reduce the source impedance, or the load impedance, as seen by the converter.

The time to speed up the electric motor is defined here as being the time required to cause its speed to vary by a significant fraction, for example $\frac{1}{1000}$, of its maximum speed with its maximum torque.

In the known methods, the regulation process involves the use of a feedback loop to establish the difference between a voltage setting $U_{cc}$ between the output points of the filter or a line current setting $I_{lc}$ and a measured value. These methods operate correctly but do not provide for reacting quickly enough to sudden variations in the line voltage $U_l$ or resistive torque of the motor. For example, these sudden variations in the line voltage $U_l$ or resistive torque can arise:

if the pantograph becomes detached from the catenary, i.e. when the pantograph loses mechanical and electrical contact with the catenary, if the pantograph becomes reattached to the catenary, i.e. when the pantograph re-establishes mechanical and electrical contact with the catenary, or in the event of a loss of adhesion between the drive wheels of the electric vehicle and the wheel bearing structures.

The invention aims to remedy these problems by proposing a quicker method for regulating the voltage $U_c$ or the line current $I_l$.

SUMMARY OF THE INVENTION

Therefore, a subject of a invention is a deadbeat control method for regulating the voltage $U_c$, in which the method includes:

calculation of a current setting $\bar{I}_{uc}$ for the average intensity $\bar{I}_u$ of a DC current $I_u$ flowing through the first output point of the filter between the instant $t_i$ and an instant $t_{i+1}$, this setting $\bar{I}_{uc}$ being established from discretized state equations of the filter in such a way that the voltage $U_c$ is equal to a predetermined voltage setting $U_{cc}$ at the instant $t_{i+1}$, these discretized state equations between them establishing relationships between the intensities $I_{li}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\bar{U}_l$ between the instants $t_i$ and $t_{i+1}$ and the average intensity $\bar{I}_u$, control of the electric converter in order to produce a current $I_u$ flowing through the output point of the filter, the average intensity $\bar{I}_u$ of which between the instants $t_i$ and $t_{i+1}$ is equal to the current setting $\bar{I}_{uc}$, the time interval T between the instants $t_i$ and $t_{i+1}$ being strictly less than $5\tau$.

Another subject of the invention is a deadbeat control method for regulating the intensity of the line current $I_l$, in which the method includes:

calculation of a current setting $\bar{I}_{uc}$ for the average intensity $\bar{I}_u$ of a DC current $I_u$ flowing through the first output point of the filter between the instant $t_i$ and an instant $t_{i+1}$, this setting $\bar{I}_{uc}$ being established from discretized state equations of the filter in such a way that the voltage $U_c$ is equal to a predetermined voltage setting $U_{cc}$ at the instant $t_{i+1}$, these discretized state equations between them establishing relationships between the intensities $I_{li}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\overline{U}_l$ between the instants $t_i$ and $t_{i+1}$ and the average intensity $\overline{I}_u$, control of the electric converter in order to produce a current $I_u$ flowing through the output point of the filter, the average intensity $\overline{I}_u$ of which between the instants $t_i$ and $t_{i+1}$ is equal to the setting $\overline{I}_{uc}$, the time interval T between the instants $t_i$ and $t_{i+1}$ being strictly less than $5\tau$.

These "deadbeat control" methods provide for arriving at the setting from the next regulation instant $t_{i+1}$. To this end, these methods do not implement a feedback loop.

More specifically, in the above deadbeat control methods, the average intensity setting $\overline{I}_{uc}$ is determined from discretized state equations of the RLC filter without using a feedback loop. These methods therefore provide for ensuring that the voltage $U_c$ or the line current $I_l$ has reached its setting exactly at the end of the interval T. Furthermore, since the interval T is in this case chosen to be small, i.e. less than five times the time constant $\tau$ of the motor, these methods react much more quickly than regulation methods that implement a feedback loop. Under these conditions, voltage surges of the line voltage $U_l$ or current surges of the line current $I_l$ are limited much more effectively in particular in the event of detachment or reattachment of the pantograph, or in the event of a loss of adhesion.

It will also be noted that adjustments to the average intensity $\overline{I}_u$ are made at intervals T that are less than $5\tau$. The intervals T are therefore much shorter than the time to speed up the electric motor due to the inertia of the electric vehicle brought to the motor shaft and due to the inertia of the rotor of the electric motor itself, such that they are not felt by the driver or passengers of this vehicle. They therefore also do not interfere with the method for controlling the torque of the electric motor.

The embodiments of the method for regulating the voltage $U_c$ can include one or more of the following features:

the voltage setting $U_{cc}$ is chosen always to be less than or equal to a voltage limit $U_{cmax}$, the voltage limit $U_{cmax}$ corresponding to the maximum voltage allowable at the input of the electric converter or between the output points of the filter;

construction of an estimate $I_{lp}$ of the line current $I_l$ which will be reached if the voltage $U_c$ is equal to the voltage setting $U_{cc}$ at the instant $t_{i+1}$, comparison of the estimate $I_{lp}$ with at least one predetermined line current limit $I_{lm}$, only if the predetermined line current limit $I_{lm}$ is crossed, modification of the voltage setting $U_{cc}$ so as to obtain a temporary voltage setting $U_{ccm}$ which corresponds to a line current estimate $I_{lp}$ that does not cross the predetermined line current limit $I_{lm}$, and use of the temporary voltage setting $U_{ccm}$ in place of the voltage setting $U_{cc}$ during the calculation of the average current setting $\overline{I}_{uc}$ only for the interval T in progress, and if the predetermined limit $I_{lm}$ is not crossed, use of the voltage setting $U_{cc}$ for calculating the average current setting $\overline{I}_{uc}$ for the interval T in progress;

the setting $\overline{I}_{uc}$ is a solution of the following system of equations:

$$I_{lp} - \mu_2 \cdot C \cdot U_{cc} = e^{\mu_1 \cdot T} \cdot (I_{li} - \mu_2 \cdot C \cdot U_{ci}) + a_1 \cdot \left(\mu_2 \cdot \overline{I}_{uc} + \frac{1}{L} \cdot \overline{U}_1\right)$$

$$I_{lp} - \mu_1 \cdot C \cdot U_{cc} = e^{\mu_2 \cdot T} \cdot (I_{li} - \mu_1 \cdot C \cdot U_{ci}) + a_2 \cdot \left(\mu_1 \cdot \overline{I}_{uc} + \frac{1}{L} \cdot \overline{U}_1\right)$$

where:

R and L are the values of the resistance and the inductance, respectively, of the RLC filter, and which are connected in series between the first input and output points, C is the capacitance of the capacitor connected between the first and second output points, $\mu_1$, and $\mu_2$ are the eigenvalues of an evolution matrix and are defined by the following relationships:

$$\mu_1 = \frac{-R \cdot C + \sqrt{R^2 \cdot C^2 - 4 \cdot L \cdot C}}{2 \cdot L \cdot C}$$

$$\mu_2 = \frac{-R \cdot C - \sqrt{R^2 \cdot C^2 - 4 \cdot L \cdot C}}{2 \cdot L \cdot C}$$

$a_1$, and $a_2$ are values defined by the following relationships:

$$a_1 = \frac{e^{\mu_1 \cdot T} - 1}{\mu_1}$$

$$a_2 = \frac{e^{\mu_2 \cdot T} - 1}{\mu_2}$$

the voltage setting $U_{cc}$ is constructed from the line voltage $U_l$ in such a way that its power spectrum does not exhibit any harmonic beyond the frequency $0.9/T_f$.

The embodiments of the method for regulating the voltage $U_c$ exhibit, furthermore, the following advantages:

by keeping the voltage $U_c$ below the limit $U_{cmax}$, untimely trips of a safety device, such as a rheostatic chopper for clipping any voltage surge on the DC bus, are avoided, by using the temporary voltage setting $U_{ccm}$, the intensity of the line current $I_l$ can be maintained within an acceptable range while limiting variations in the voltage $U_c$, and by choosing a voltage setting $U_{cc}$ such that its power spectrum does not exhibit any harmonic beyond the frequency $0.9/T_f$, oscillations of the line current $I_l$ and of the capacitor voltage $U_c$ close to the natural frequency of the filter are avoided and also the control energy is minimized.

The embodiments of the method for regulating the intensity of the line current $I_l$ can include one or more of the following features:

the line current setting $I_{lc}$ is chosen always to be less than or equal to a limit $I_{lmax}$, the limit $I_{lmax}$ corresponding to the intensity of the line current $I_l$ at which a circuit-breaker of a power substation of the catenary or a circuit-breaker of the vehicle is tripped;

the line current setting $I_{lc}$ is chosen always to be greater than or equal to a limit $I_{lmin}$, the limit $I_{lmin}$ corresponding to the intensity of the line current below which the inductance L of the filter is desaturated;

construction of an estimate $U_{cp}$ of the voltage $U_c$ which will be reached between the output points at the instant $t_{i+1}$ if the intensity of the line current $I_l$ is equal to the setting $I_{lc}$ at the instant $t_{i+1}$, comparison of the voltage estimate $U_{cp}$ with at least one predetermined voltage limit $U_{cm}$, only if the predetermined voltage limit $U_{cm}$ is crossed, modification of the line current setting $I_{lc}$ so as to obtain a temporary line current setting $I_{lcm}$ which corresponds to an estimate $U_{cp}$ that does not cross the predetermined limit $U_{cm}$, and use of the temporary line current setting $I_{lcm}$ in place of the line current setting $I_{lc}$ during the control of the converter only over the interval T in progress, and if the predetermined voltage limit $U_{cm}$ is not crossed, use of the line current setting $I_{lc}$ during the calculation of the average current setting $\bar{I}_{uc}$ for the interval T in progress;

the average current setting $\bar{I}_{uc}$ is a solution of the following system of equations:

$$I_{lc} - \mu_2 \cdot C \cdot U_{cp} = e^{\mu_1 \cdot T} \cdot (I_{li} - \mu_2 \cdot C \cdot U_{ci}) + a_1 \cdot \left(\mu_2 \cdot \bar{I}_{uc} + \frac{1}{L} \cdot \bar{U}_l\right)$$

$$I_{lc} - \mu_1 \cdot C \cdot U_{cp} = e^{\mu_2 \cdot T} \cdot (I_{li} - \mu_1 \cdot C \cdot U_{ci}) + a_2 \cdot \left(\mu_1 \cdot \bar{I}_{uc} + \frac{1}{L} \cdot \bar{U}_l\right)$$

where:

R and L are the values of the resistance and the inductance, respectively, of the RLC filter, and which are connected in series between the first input and output points, C is the capacitance of the capacitor connected between the first and second output points, $\mu_1$ and $\mu_2$ are the eigenvalues of an evolution matrix and are defined by the following relationships:

$$\mu_1 = \frac{-R \cdot C + \sqrt{R^2 \cdot C^2 - 4 \cdot L \cdot C}}{2 \cdot L \cdot C}$$

$$\mu_2 = \frac{-R \cdot C - \sqrt{R^2 \cdot C^2 - 4 \cdot L \cdot C}}{2 \cdot L \cdot C}$$

$a_1$ and $a_2$ are values defined by the following relationships:

$$a_1 = \frac{e^{\mu_1 \cdot T} - 1}{\mu_1}$$

$$a_2 = \frac{e^{\mu_2 \cdot T} - 1}{\mu_2}$$

a first phase for regulating only the voltage $U_c$ between the first and second output points of the filter, a second phase for regulating only the line current $I_l$, switchover from the first phase to the second phase as soon as the line current $I_l$ crosses a limit $I_{lm}$ and switchover from the second phase to the first phase as soon as the line current $I_l$ crosses the same or another limit in the opposite direction.

The embodiments of the method for regulating the line current $I_l$ exhibit, furthermore, the following advantages:

by choosing the line current setting $I_{lc}$ to be lower than the limit $I_{lmax}$, untimely trips of the circuit-breaker of a substation, or of the circuit-breaker protecting equipment on the vehicle itself, are always avoided, by choosing the line current setting $I_{lc}$ to be always greater than the limit $I_{lmin}$, the saturated inductance L is always preserved and therefore this provides for remaining within a linear operating zone, thereby avoiding a scenario in which the inductance L suddenly releases a high amount of energy while desaturating, by using the temporary line current setting $I_{lcm}$, the voltage $U_c$ is always maintained within an acceptable operating range while limiting variations in the line current $I_l$, alternating between phases for regulating the voltage $U_c$ only and the line current $I_l$ only provides for maintaining both the voltage $U_c$ and line current $I_l$ within acceptable operating ranges.

The methods for regulating the voltage $U_c$ or the line current $I_l$ can include one or more of the following features:

the method includes the control of a rheostat in order to produce, in combination with the control of the converter, the current $I_u$ flowing through the first output terminal, the average intensity $\bar{I}_u$ of which between the instants $t_i$ and $t_{i+1}$ is equal to the current setting $\bar{I}_{uc}$;

the interval T is less than or equal to $\tau/5$.

The above embodiments of methods for regulating the voltage $U_c$ or the line current $I_l$ exhibit, furthermore, the following advantages:

by using the rheostat to produce the current $I_u$ in addition to the converter, a variation in the voltage $U_c$ or the line current $I_l$ can be compensated for more rapidly than if only the converter were used, by choosing the interval T to be less than or equal to $\tau/5$, the amplitude of variations in the current $I_u$ can be limited, thereby improving the characteristics of the regulation method.

Another subject of the invention is an information recording medium including instructions for executing any one of the above regulation methods, when these instructions are executed by an electronic computer.

Another subject of the invention is an electric vehicle including:

a DC bus formed by two conductors, at least one traction motor of the electric vehicle having a stator time constant $\tau$, a controllable electric converter intended to cause the torque of the traction motor to vary, a low-pass RLC filter including two input points electrically connected, respectively, to the two conductors of the DC bus, and first and second output points electrically connected to the electric converter, sensors or estimators intended to measure or estimate the intensity $I_{li}$ of a line current $I_l$ flowing through the inductance of the filter at the instant $t_i$, a voltage $U_{ci}$ between the output points of the filter at the instant $t_i$, and a line voltage $U_l$ between the input points of the filter;

a computer for calculating a current setting $\bar{I}_{uc}$ for the average intensity $\bar{I}_u$ of a DC current $I_u$ flowing through the first output point of the filter between the instant $t_i$ and an instant $t_{i+1}$, this current setting $\bar{I}_{uc}$ being established from discretized state equations of the filter in such a way that the voltage $U_c$ is equal to a predetermined voltage setting $U_{cc}$ at the instant $t_{i+1}$, these discretized state equations between them establishing relationships between the intensities $I_{li}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\bar{U}_l$ between the instants $t_i$ and $t_{i+1}$ and the average intensity $\bar{I}_{uc}$, a control unit for controlling the electric converter in order to produce a current $I_u$ flowing through the output point of the filter, the average intensity $\bar{I}_u$ of which between the instants $t_i$ and $t_{i+1}$ is equal to the current setting $\bar{I}_{uc}$, the time interval T between the instants $t_i$ and $t_{i+1}$ being strictly less than $5\tau$.

Another subject of the invention is another electric vehicle including:

a computer for calculating a current setting $\bar{I}_{uc}$ for the average intensity $\bar{I}_u$ of a DC current $I_u$ flowing through the first output point of the filter between the instant $t_i$ and an instant $t_{i+1}$, this current setting $\bar{I}_{uc}$ being established from discretized state equations of the filter in such a way that the intensity of the line current $I_l$ is equal to a predetermined line current setting $I_{lc}$ at the instant $t_{i+1}$, these discretized state equations between them establishing relationships between the intensities $I_{l,i}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\bar{U}_l$ between the instants $t_i$ and $t_{i+1}$ and the average intensity $\bar{I}_u$, and a control unit for controlling the electric converter in order to produce a current $I_u$ flowing through the output point of the filter, the average intensity $\bar{I}_u$ of which between the instants $t_i$ and $t_{i+1}$ is equal to the current setting $\bar{I}_{uc}$, the time interval T between the instants $t_i$ and $t_{i+1}$ being strictly less than $5\tau$.

BRIEF DESCRIPTION OF THE DRAWINGS

The invention will be better understood on reading the following description given purely by way of non-limiting example and with reference to the drawings in which.

DETAILED DESCRIPTION OF THE PREFERRED EMBODIMENT

In these drawings, the same references are used to denote the same items.

Hereafter in this description, features and functions that are well known to a person skilled in the art are not described in detail.

Figure 1:
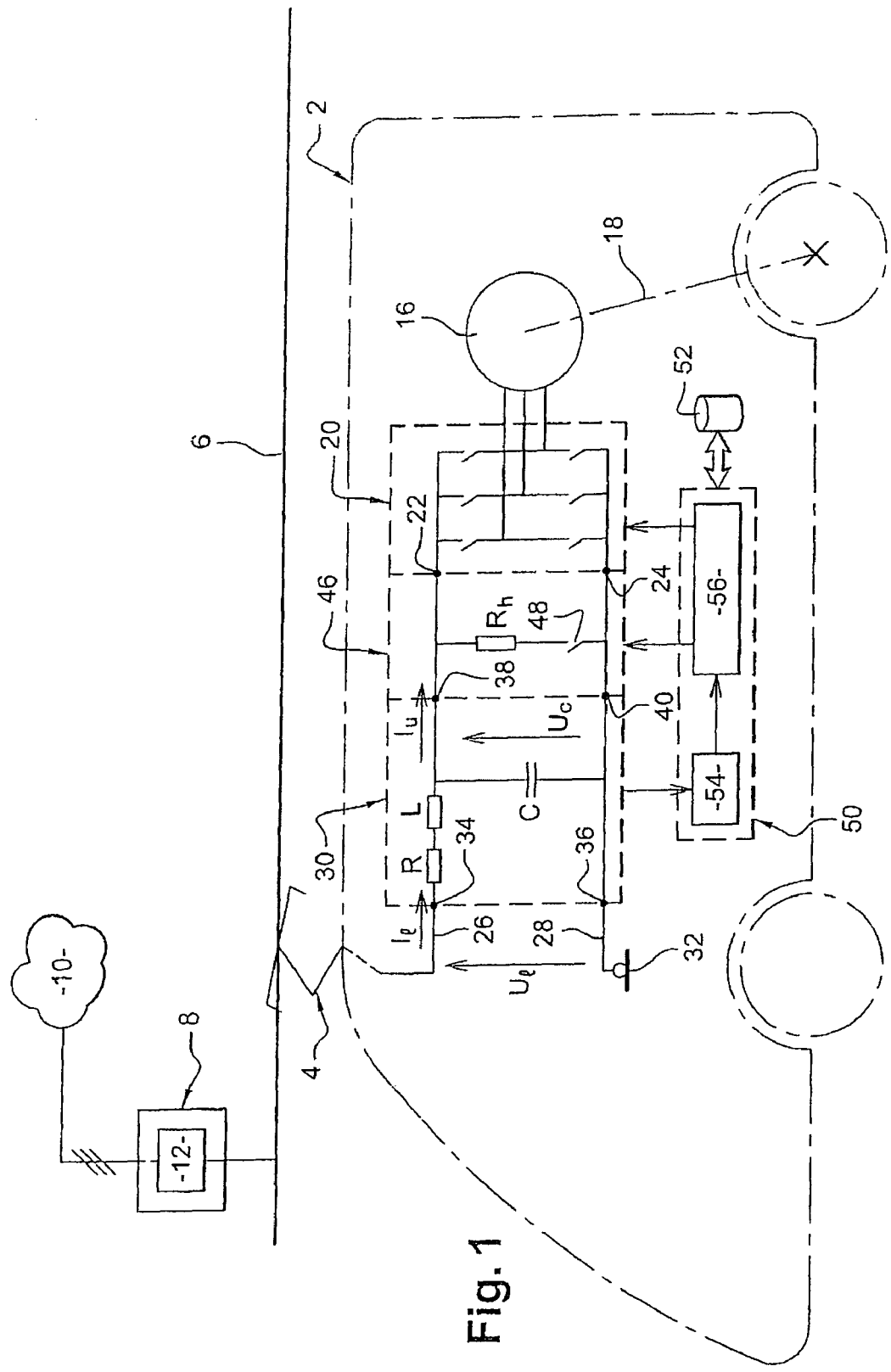
FIG. 1 is a schematic illustration of an electric vehicle equipped with an RLC filter upstream of an electric converter.

FIG. 1 represents an electric vehicle 2 equipped with a pantograph 4 sliding against an overhead catenary 6. The vehicle 2 is, for example, a railway vehicle such as a train. The catenary 6 is in this example powered by a DC supply via several substations arranged at regular intervals along the catenary 6. These substations are, for example, separated one from the other by distances greater than several kilometers.

To simplify FIG. 1, only one substation 8 has been represented. This substation 8 is connected to a three-phase electrical power distribution network 10. The substation 8 converts the three-phase voltage into a DC voltage which is then delivered on the catenary 6. Typically, the substation 8 comprises a circuit-breaker 12 able to electrically isolate the catenary 6 from the network 10 if the current in the catenary 6 exceeds a limit $I_{lmax}$.

The vehicle 2 is equipped with an electric motor 16 intended to rotationally drive the drive wheels of the vehicle via a drive shaft 18.

Here, the motor 16 is a three-phase synchronous or asynchronous motor. This motor 16 is powered by an electric converter 20 intended to generate a three-phase voltage supplying the motor 16 from a DC voltage $U_c$. The motor 16 operates in traction mode and, alternately, as a three-phase voltage generator, for example, when the vehicle 2 brakes.

The stator time constant $\tau$ of the motor 16 is between 4 ms and 100 ms.

Here, the converter 20 is formed by three arms connected in parallel between input points 22 and 24. Each arm comprises two controllable switches connected in series via a middle point. Each middle point is connected to a respective phase of the motor 16.

The points 22 and 24 are connected to the conductors 26 and 28, respectively, of a DC bus via an RLC filter 30.

The conductor 26 is connected electrically to the pantograph 4 via various items of equipment that are not represented, such as for example a circuit-breaker, a transformer and a rectifier bridge, so as to be supplied with a DC voltage via the catenary 6. The conductor 28 is electrically connected to a reference potential 32, via the rails of a railway track, or a second conductor which can be overhead or in the form of a ground-based rail against which current return contact shoes slide.

The filter 30 is a low-pass RLC filter, the natural period $T_f$ of which is strictly greater than the time constant $\tau$ of the motor 16. Preferably, the natural period $T_f$ of the filter 30 is greater than at least five or ten times the time constant $\tau$ of the motor 16 so that it can fulfil its filtering function.

The filter 30 comprises two input points 34 and 36 connected to the conductors 26 and 28 respectively so as to receive between these input points the line voltage $U_l$. The filter 30 also comprises two output points 38 and 40 electrically connected to the input points 22 and 24, respectively, of the converter 20. A resistance R and an inductance L are connected in series between the points 34 and 38. The resistance R and the inductance L have been represented here as two separate items. However, in practice, the resistance R and the inductance L can be formed by one and the same component such as a winding.

The current flowing through the inductance L is denoted by $I_l$. This current is called the line current.

The filter 30 also comprises a capacitor C electrically connected directly between the output points 38 and 40. The voltage across the terminals of this capacitor C is denoted by $U_c$. The current flowing through the point 38 is denoted by $I_u$.

The vehicle 2 can also comprise an electric braking rheostat 46 connected between the points 38 and 40 and the points 22 and 24. Typically, this rheostat 46 is intended to dissipate the electrical energy produced by the motor 16 when the latter operates as a generator and when the catenary 6 or the vehicle 2 is not in conditions for retrieving the braking energy. For example, the rheostat 46 is formed by a resistance $R_h$ connected in series with a controllable switch 48 between the output points 38 and 40. The switch 48 is controllable so as to regulate the intensity of the current flowing through the resistance $R_h$.

The vehicle 2 also comprises a unit 50 for driving the rheostat 46 and the converter 20 based on, in addition, measurements made at the filter 30. To this end, the unit 50 is connected to a memory 52 containing instructions to execute one of the methods of FIGS. 3 to 5. The memory 52 also contains the values of the various operating limits which will be described further in detail with reference to FIGS. 3 and 4.

The unit 50 is constructed from one or more electronic computers.

Here, the unit 50 is, for example, formed by a computer 54 intended to establish, based on measurements made at the filter 30, a setting $\bar{I}_{uc}$ for the average intensity $\bar{I}_u$ of the DC current $I_u$ over an interval T.

The unit 50 also comprises a control unit 56 intended to control both the rheostat 46 and the converter 20 in order to arrive at the setting $\bar{I}_{uc}$. To this end, the unit 56 is connected to the rheostat 46 and to the converter 20. The unit 56 is also able to control the converter 20 as a function of a setting $\Gamma_c$ for the torque to be supplied by the motor 16 in order to accelerate or brake the vehicle 2.

Figure 2:
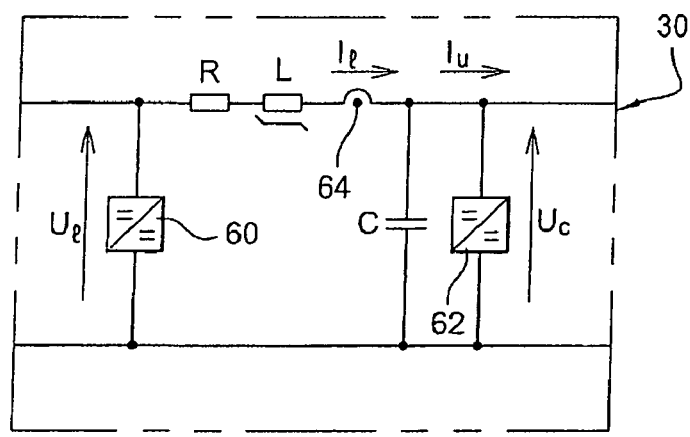
FIG. 2 is a simplified equivalent circuit diagram of the RLC filter of the vehicle of FIG. 1, FIGS. 3 and 4 are flow charts of deadbeat control methods for regulating the voltage $U_c$ and the line current $I_l$, respectively, of the RLC filter of the vehicle of FIG. 1.

FIG. 2 represents a simplified electric circuit diagram of the filter 30 on which the various sign conventions for the line voltage $U_l$, the line current $I_l$, the current $I_u$ and the voltage $U_c$ are defined. In FIG. 2, sensors 60, 62 and 64 for the line voltage $U_l$, the voltage $U_c$ and the intensity of the line current $I_l$, respectively, have been represented. These sensors 60, 62 and 64 are connected to the computer 54.

Figures 3, 4:
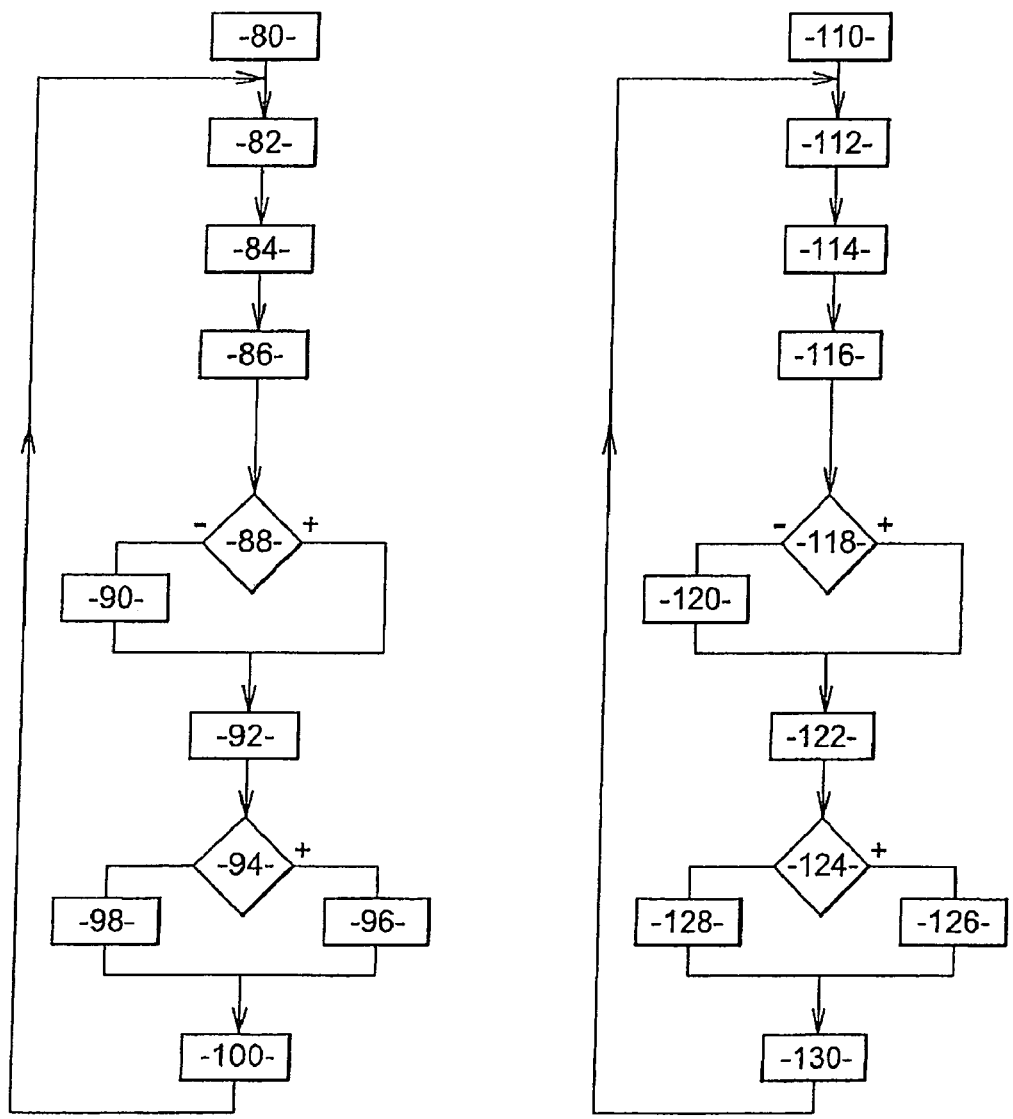

FIG. 3 represents a deadbeat control method for regulating the voltage $U_c$, the method being implemented by the driving unit 50.

Initially, at a step 80, a sampling period T is chosen. Hereafter in this description, $t_i$ denotes the instant at which the various measurements made by the sensors 60, 62 and 64 are sampled, and $t_{i+1}$ the next sampling instant. These instants $t_i$ and $t_{i+1}$ are separated by the time interval T.

Here, the interval T is chosen to be sufficiently small in order that over a single interval T the intensity of the current $I_u$ does not have the time to reach its asymptotic value, i.e. $U_c/R_m$, where $R_m$ is the stator resistance of the motor 16. This is because this asymptotic value can be up to a hundred times higher than an upper limit $I_{umax}$ that is acceptable for the intensity of the current $I_u$. To this end, the interval T is therefore chosen to be strictly less than 5τ. Preferably, the interval T is chosen to be less than $$\frac{\tau}{5} \text{ or } \frac{\tau}{10}.$$

Here, in the context of electric vehicles, the interval T is generally less than 20 ms.

It is also beneficial to choose an interval T which is not too small such that the intensity of the current $I_u$ has the time to vary in a significant way between the instants $t_i$ and $t_{i+1}$. To this end, here, the interval T is chosen to be greater than 100 μs.

Next, at the instant $t_i$, at a step 82, the voltage $U_c$, the line voltage $U_l$ and the line current $I_l$ are measured. The results of these measurements are denoted by $U_{ci}$, $U_{li}$ and $I_{li}$ respectively. At the step 82, it is also possible to calculate the value of the inductance L of the filter 30 if that value varies as a function of the current $I_l$.

At a next step 84, a voltage setting $U_{cc}$ for the voltage $U_c$ is fixed. For example, the voltage setting $U_{cc}$ is defined from the average value of the voltages $U_l$ measured at the previous sampling instants. The average is produced over a period of time that is strictly greater than the natural period $T_f$ of the filter 30 and preferably at least ten times greater than the natural period $T_f$. For example, the voltage setting $U_{cc}$ is determined using following relationship:

$$U_{cc} = \frac{1}{N}\sum_{i=1}^{N}(U_{li} - RI_{li}) \tag{1}$$

where:

N is the number of intervals T taken into account to calculate the average, the voltages $U_{li}$ are the line voltages measured at the previous instants i, the intensities $I_{li}$ are the line current intensities $I_l$ measured at the previous instants $t_i$, and R is the resistance of the filter 30.

Next, at a step 86, an estimate $I_{lp}$ of the intensity of the current $I_l$ which will be reached at the instant $t_{i+1}$, if at the instant $t_{i+1}$ the voltage $U_c$ is equal to the voltage setting $U_{cc}$, is constructed. For example, the estimate $I_{lp}$ is constructed from the following relationship:

$$I_{lp} = \frac{\mu_1 \cdot \mu_2 \cdot C \cdot (a_2 - a_1) \cdot U_{cc} -}{(a_2 \cdot \mu_1 - a_1 \cdot \mu_2)} \tag{2}$$

$$I_{lp} = \frac{(a_1 \cdot \mu_2 \cdot e^{\mu_2 \cdot T} - a_2 \mu_1 \cdot e^{\mu_1 \cdot T}) \cdot I_{li} + \mu_1 \cdot}{\mu_2 \cdot C \cdot [a_1 \cdot a_2 \cdot (\mu_1 - \mu_2) \cdot \overline{U}_l + (a_1 e^{\mu_2 \cdot T} - a_2 \cdot e^{\mu_1 \cdot T}) \cdot U_{ci}]}{(a_2 \cdot \mu_1 - a_1 \cdot \mu_2)}$$

where:

C is the value of the capacitance C of the filter 30, $\overline{U}_l$ is the average value of the voltage $U_l$ over the interval T, $\mu_1$, $\mu_2$, $a_1$, $a_2$ are defined below, $e^x$ is the exponential function.

It is assumed here that the line voltage is constant over the interval T such that the average value $\overline{U}_l$ is equal to $U_{li}$.

$\mu_1$ and $\mu_2$ are the eigenvalues of an evolution matrix of the filter 30. These values are defined by the following relationships:

$$\mu_1 = \frac{-R \cdot C + \sqrt{R^2 \cdot C^2 - 4 \cdot L \cdot C}}{2 \cdot L \cdot C} \tag{3}$$

$$\mu_2 = \frac{-R \cdot C - \sqrt{R^2 \cdot C^2 - 4 \cdot L \cdot C}}{2 \cdot L \cdot C} \tag{4}$$

where R, C and L are the values of the resistance R, the capacitance of the capacitor C and the value of the inductance L, respectively, of the filter 30.

$a_1$ and $a_2$ are defined by the following relationships:

$$a_1 = \frac{e^{\mu_1 \cdot T} - 1}{\mu_1} \tag{5}$$

$$a_2 = \frac{e^{\mu_2 \cdot T} - 1}{\mu_2} \tag{6}$$

The relationship (2) has been obtained from the following discretized state equations of the filter 30, after elimination of $\bar{I}_u$ in the following system of equations (7) and (8):

$$I_{li+1} - \mu_2 \cdot C \cdot U_{ci+1} = e^{\mu_1 \cdot T} \cdot (I_{li} - \mu_2 \cdot C \cdot U_{ci}) + a_1 \cdot \begin{pmatrix} \mu_2 \cdot \overline{I}_u + \\ \frac{1}{L} \cdot \overline{U}_l \end{pmatrix} \quad (7)$$

$$I_{li+1} - \mu_1 \cdot C \cdot U_{ci+1} = e^{\mu_2 \cdot T} \cdot (I_{li} - \mu_1 \cdot C \cdot U_{ci}) + a_2 \cdot \begin{pmatrix} \mu_1 \cdot \overline{I}_u + \\ \frac{1}{L} \cdot \overline{U}_l \end{pmatrix} \quad (8)$$

where:

$U_{ci}$ and $I_{li}$ are the voltage UC and the intensity of the current $I_l$ measured at the instant $t_{i+1}$.

$I_{l,i+1}$ and $U_{c,i+1}$ are the intensity of the current $I_l$ and the voltage $U_c$ at the instant $t_{i+1}$.

Given that the regulation method implemented is a deadbeat control method, at the instant $t_{i+1}$, the voltage $U_{c,i+1}$ is equal to the voltage setting $U_{cc}$. Furthermore, assuming that the line voltage $U_l$ is constant over the interval T, the average voltage $\overline{U}_l$ is equal to $U_{li}$. Under these conditions, the relationships (7) and (8) form a system of two equations with two unknowns, i.e. $I_{l,i+1}$ and $\overline{I}_u$. It is therefore possible to solve this system of equations analytically in order to obtain the estimate $I_{lp}$ (2) which corresponds to the value $I_{l,i+1}$, eliminating $\overline{I}_u$ in the system of equations (7) and (8).

The way in which the relationships (7) and (8) have been obtained is described further in detail at the end of this description, in a section entitled "Establishing discretized state equations".

Next, at a step 88, the estimate $I_{lp}$ is compared with operating limits $I_{lmin}$ and $I_{lmax}$, within which the intensity of the line current $I_l$ must be maintained. For example, the limit $I_{lmin}$ is chosen to correspond to a saturated state of the inductance L, thereby providing for keeping the inductance L saturated as long as the method of FIG. 3 is executed. This exhibits the advantage of avoiding a scenario in which the inductance suddenly releases a high amount of energy when it desaturates. The limit $I_{lmax}$ is that defined in relation to the circuit-breaker 12, or to the circuit-breaker on board the vehicle for protecting onboard equipment, according to their respective tripping limit by vehicle. For the circuit-breaker 12, this tripping limit is related to each vehicle according to the number of vehicles capable of circulating at a given time on the portion of line powered by the substation protected by the circuit-breaker 12, for example: tripping limit of the substation divided by the maximum number of vehicles.

If the estimate $I_{lp}$ does not fall within the range $[I_{lmin}, I_{lmax}]$, at a step 90 the computer 54 modifies the voltage setting $U_{cc}$ to obtain a temporary voltage setting $U_{ccm}$ which provides for obtaining at the instant $t_{i+1}$ an intensity of the current $I_l$ contained within the range $[I_{lmin}, I_{lmax}]$. For example, the temporary voltage setting $U_{ccm}$ is obtained from the following relationship:

$$U_{ccm} = \frac{(a_2 \cdot \mu_1 - a_1 \cdot \mu_2) I_{lm} + (a_1 \cdot \mu_2 \cdot e^{\mu_2 \cdot T} - a_2 \cdot \mu_1 \cdot e^{\mu_1 \cdot T}) \cdot}{\mu_1 \cdot \mu_2 \cdot C \cdot (a_2 - a_1)} \quad (9)$$
$$\frac{I_{li} - \mu_1 \cdot \mu_2 \cdot C \cdot \begin{bmatrix} a_1 \cdot a_2 \cdot (\mu_1 - \mu_2) \cdot \overline{U}_l + \\ (a_1 \cdot e^{\mu_2 \cdot T} - a_2 \cdot e^{\mu_1 \cdot T}) \cdot U_{ci} \end{bmatrix}}{\mu_1 \cdot \mu_2 \cdot C \cdot (a_2 - a_1)}$$

where $I_{lm}$ is a limit value of the intensity of the line current $I_l$ chosen from the set $\{I_{lmin}; I_{lmax}\}$.

More specifically, $I_{lm}$ is chosen to be equal to $I_{lmin}$ if the estimate $I_{lp}$ constructed at the step 86 is smaller than the limit $I_{lmin}$. Otherwise, i.e. if this estimate is greater than the limit $I_{lmax}$, then the value of the intensity $I_{lm}$ is chosen to be equal to the limit $I_{lmax}$.

The relationship (9) provides for obtaining the temporary voltage setting $U_{ccm}$ that is the closest to the initial voltage setting $U_{cc}$, while maintaining the intensity of the line current $I_l$ within the range $[I_{lmin}, I_{lmax}]$.

After the step 90, at a step 92 the computer 54 calculates a current setting $\overline{I}_{uc}$ for the average intensity of the current $I_u$ between the instants $t_i$ and $t_{i+1}$.

If at the step 88, the estimate $I_{lp}$ is contained within the range $[I_{lmin}, I_{lmax}]$, then the computer 54 proceeds directly to the step 92.

The setting $\overline{I}_{uc}$ is determined analytically so that, at the instant $t_{i+1}$, the voltage $U_c$ is exactly equal to the voltage setting $U_{cc}$ or to the temporary voltage setting $U_{ccm}$ if the step 90 has been executed. For example, the current setting $\overline{I}_{uc}$ is established from the following relationship:

$$\overline{I}_{uc} = \frac{(e^{\mu_1 \cdot T} - e^{\mu_2 \cdot T}) \cdot I_{li} + C \cdot \begin{bmatrix} \mu_1 \cdot \mu_2 \cdot (a_1 - a_2) \cdot \overline{U}_l - (\mu_1 - \mu_2) \cdot \\ U_{cc} - (\mu_2 \cdot e^{\mu_1 \cdot T} - \mu_1 \cdot e^{\mu_2 \cdot T}) \cdot U_{ci} \end{bmatrix}}{(a_2 \cdot \mu_1 - a_1 \cdot \mu_2)} \quad (10)$$

The relationship (10) is obtained by solving the discretized state equations defined by the relationships (7) and (8) in order to extract from them the unknown $\overline{I}_{uc}$, after elimination of $I_{l,i+1}$ in the system of equations (7) and (8).

Next, at a step 94, the current setting $\overline{I}_{uc}$ is compared with an acceptable predetermined operating range $[\overline{I}_{u\ min}, \overline{I}_{u\ max}]$.

By way of example, the limit $\overline{I}_{u\ min}$ is chosen to be equal to the minimum average intensity of the current $I_u$ that can be generated by the converter 20 when the motor 16 operates as a generator. This average is established over the sampling period T. The limit $\overline{I}_{u\ min}$ is negative since the motor is operating as a generator.

The limit $\overline{I}_{u\ max}$ is, for its part, for example, chosen to be equal to the sum of the maximum average intensity of the current that can be absorbed by the rheostat 46 and the maximum average intensity of the current that can be absorbed by the converter 20. The maximum average intensity that can be absorbed by the converter 20 is a function of the electrical characteristics of this converter. The maximum average intensity that can be absorbed by the rheostat is, for example, given by the ratio of a maximum allowable voltage $U_{cmax}$ between the conductors 26 and 28 to the value of the resistance $R_h$. These averages are established over the sampling period T.

If the current setting $\overline{I}_{uc}$ is in the range $[\overline{I}_{u\ min}, \overline{I}_{u\ max}]$ then the setting is transmitted as such to the control unit 56 at a step 96. Otherwise, one of the two limits $\overline{I}_{u\ min}$ or $\overline{I}_{u\ max}$ is transmitted to the unit 56 at a step 98.

More specifically, at the step 98, the limit $\overline{I}_{u\ min}$ is transmitted to the unit 56 as a current setting $\overline{I}_{uc}$ if the current setting $\overline{I}_{uc}$ established at the step 92 is less than the limit $\overline{I}_{u\ min}$. Otherwise, it is the limit $\overline{I}_{u\ max}$ which is transmitted as the setting of the average intensity of the current $I_u$ to the unit 56.

After the step 96 or 98, at a step 100 the unit 56 controls the converter 20 and if necessary the rheostat 46 over the interval T in order to produce a current $I_u$, the average intensity of which is equal to the current setting $\overline{I}_{uc}$. More specifically, for the case in which the current setting $\overline{I}_{uc}$ is positive, i.e. when current is being consumed, the unit 56 can control either only the rheostat 46 or only the converter 20, or both the rheostat 46 and the converter 20 to produce a current $I_u$, the average intensity of which over the interval T is equal to the current setting $\bar{I}_{uc}$.

For example, if only the rheostat 46 is controlled, the duty factor or angle of opening of the switch 48 is calculated from the following relationship:

$$\alpha = \frac{R_h \cdot \bar{I}_{uc}}{\bar{U}_c} \quad (11)$$

where $\bar{U}_c$ is the average value of the voltage $U_c$ between the instant $t_i$ and $t_{i+1}$.

The average value $\bar{U}_c$ can, for example, be calculated from the following relationship:

$$\bar{U}_c = \frac{U_{cc} + U_{ci}}{2} \quad (12)$$

The unit 56 can also modify the setting $\Gamma_c$ for the torque that the motor 16 must produce in order that the average intensity $\bar{I}_u$ is equal to the current setting $\bar{I}_{uc}$.

A simultaneous control of the converter 20 and the rheostat 46 to produce a current $I_u$, the average intensity $\bar{I}_u$ of which is equal to a current setting $\bar{I}_{uc}$, is also possible.

For the case in which the current setting $\bar{I}_{uc}$ is negative, i.e. when the converter 20 generates current, the unit 56 controls only the converter 20.

Variations in the torque setting $\Gamma_c$ which are required to produce a current $I_u$, the average intensity $\bar{I}_u$ of which is equal to the setting $\bar{I}_{uc}$, are produced sometimes in the positive direction, sometimes in the negative direction around a nominal point. Furthermore, the modified torque setting $\Gamma_c$ lasts only for the interval T which is very small compared to the time to speed up the electric motor. Thus, the driver or passengers of the vehicle 2 do not feel these very fast changes in torque.

After the step 100, the method returns to the step 82. The steps 82 to 100 are therefore repeated at each sampling instant.

FIG. 4 represents a deadbeat control method for regulating the intensity of the line current $I_l$; this method starts with a step 110 that is identical to the step 80. Next, at a step 112, the voltages $U_{ci}$, $U_{li}$ and the line current $I_{li}$ are measured. This step 112 is, for example, identical to the step 82.

At a step 114, a line current setting $I_{lc}$ for the intensity of the line current $I_l$ is fixed. The setting $I_{lc}$ is chosen to be in the range [$I_{lmin}$, $I_{lmax}$]. For example, the setting $I_{lc}$ is chosen to be equal to $I_{lmin}$ or $I_{lmax}$.

Next, at a step 116, an estimate $U_{cp}$ of the voltage $U_c$ at the instant $t_{i+1}$, if the intensity of the line current $I_l$ at this instant is equal to the line current setting $I_{lc}$, is constructed. For example, this voltage estimate $U_{cp}$ is constructed from the following relationship:

$$U_{cp} = \frac{(a_1 \cdot \mu_2 - a_2 \cdot \mu_1) \cdot I_{lc} - \begin{pmatrix} a_1 \cdot \mu_2 \cdot e^{\mu_2 \cdot T} - \\ a_2 \cdot \mu_1 \cdot e^{\mu_1 \cdot T} \end{pmatrix} \cdot I_{li} + \mu_1 \cdot \mu_2 \cdot C \cdot \begin{bmatrix} a_1 \cdot a_2 \cdot (\mu_1 - \mu_2) \cdot \overline{U}_l - \\ (a_2 \cdot e^{\mu_1 \cdot T} - a_1 \cdot e^{\mu_2 \cdot T}) \cdot U_{ci} \end{bmatrix}}{(a_1 - a_2) \cdot \mu_1 \cdot \mu_2 \cdot C} \quad (13)$$

The relationship (13) is obtained by solving the system of state equations defined by the relationships (7) and (8) for the case in which $I_{l,i+1}$ is equal to $I_{lc}$, eliminating $I_u$ in the system of equations (7) and (8).

At a step 118, the voltage estimate $U_{cp}$ is compared with an acceptable operating range [$U_{cmin}$, $U_{cmax}$].

The limit $U_{cmax}$ is, for example, equal to the acceptable maximum voltage between the conductors 26 and 28 and beyond which the rheostat 46 is operated to clip any voltage exceeding this dimensioning limit of the converter 20.

The limit $U_{cmin}$ is for example chosen to be at the minimum of the acceptable voltage for operation at reduced speed, beyond which the capacitor must be recharged from the line.

At a step 120, if the voltage estimate $U_{cp}$ does not fall within the range [$U_{cmin}$, $U_{cmax}$], then the line current setting $I_{lc}$ is modified to obtain a temporary line current setting $I_{lcm}$ which provides for maintaining the voltage $U_c$ within the range [$U_{cmin}$, $U_{cmax}$] at the instant $t_{i+1}$. For example, here, the temporary line current setting $I_{lcm}$ is chosen in order that, at the instant $t_{i+1}$, the voltage $U_c$ is equal to the limit $U_{cmin}$ or to the limit $U_{cmax}$. For example, to this end, the temporary setting $I_{lcm}$ is constructed from the following relationship:

$$I_{lcm} = \frac{(a_1 \cdot \mu_2 \cdot e^{\mu_2 \cdot T} - a_2 \cdot \mu_1 \cdot e^{\mu_1 \cdot T}) \cdot I_{li} - \mu_1 \cdot \mu_2 \cdot C \cdot \begin{bmatrix} a_1 \cdot a_2 \cdot (\mu_1 - \mu_2) \cdot \overline{U}_l - \\ \begin{pmatrix} a_2 \cdot e^{\mu_1 \cdot T} - \\ a_1 \cdot e^{\mu_2 \cdot T} \end{pmatrix} \cdot U_{ci} - (a_1 - a_2) \cdot U_{cm} \end{bmatrix}}{a_1 \cdot \mu_2 - a_2 \cdot \mu_1} \quad (14)$$

where $U_{cm}$ is a value chosen from the set $\{U_{cmin}; U_{cmax}\}$

More specifically, the value $U_{cm}$ is chosen to be equal to $U_{cmin}$ if the estimate $U_{cp}$ is less than the limit $U_{cmin}$. Otherwise, i.e. if the estimate $U_{cp}$ is greater than the limit $U_{cmax}$, the value $U_{cm}$ is chosen to be equal to the limit $U_{cmax}$.

After the step 120, or if the estimate $U_{cp}$ falls within the range [$U_{cmin}$, $U_{cmax}$], a step 122 for calculating a current setting $\bar{I}_{uc}$ for the average intensity of the current $I_u$ between the instants $t_i$ and $t_{i+1}$ is carried out. More specifically, the current setting $\bar{I}_{uc}$ is calculated in order that, exactly at the instant $t_{i+1}$, the intensity of the line current $I_l$ is equal to the line current setting $I_{lc}$ or to the temporary line current setting $I_{lcm}$ if the step 120 has been executed.

For example, the setting $\bar{I}_{uc}$ is calculated from the following relationship:

$$\bar{I}_{uc} = \frac{(\mu_1 - \mu_2) \cdot I_{lc} - (u_1 \cdot e^{\mu_1 \cdot T} - \mu_2 \cdot e^{\mu_2 \cdot T}) \cdot I_{li} + \mu_1 \cdot \mu_2 \cdot C \cdot (e^{\mu_1 \cdot T} - e^{\mu_2 \cdot T}) \cdot (U_{ci} - \overline{U}_l)}{\mu_1 \cdot \mu_2 \cdot (a_1 - a_2)} \quad (15)$$

The relationship (15) is obtained by solving the system of discretized state equations defined by the relationships (7) and (8) for the case in which $I_{l,i+1}$ is equal to $I_{lc}$ and $\bar{I}_u$ is equal to $\bar{I}_{uc}$, after elimination of $U_{c,i+1}$.

Next, the unit 56 executes steps 124, 126, 128, 130 which are identical to the steps 94, 96, 98 and 100, respectively, of the method of FIG. 3.

Given that the driving unit 50 cannot act on the line voltage $U_l$ which is fixed by the voltage of the catenary 6, only the intensity of the current $I_u$ can be controlled. Under these conditions, over an interval T, it is only possible to regulate either only the voltage $U_c$ or only the line current $I_l$. In other words, the methods of FIGS. 3 and 4 cannot be executed simultaneously. On the other hand, it is possible to regulate, alternately, the voltage $U_c$ and the line current $I_l$ by executing the methods of FIGS. 3 and 4 alternately. This has the effect, for example, of stabilizing the voltage $U_c$ while maintaining the line current $I_l$ within the operating range $[I_{lmin}, I_{lmax}]$. For example, to prevent exceeding the limit $I_{lmax}$, the method of FIG. 5 is implemented.

Figure 5:
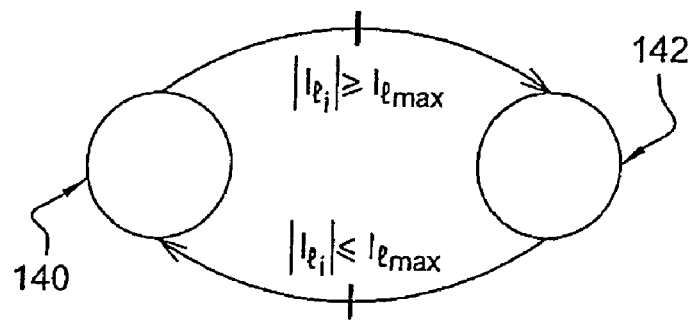
FIG. 5 is a state diagram of a deadbeat control method for regulating both the voltage $U_c$ and the line current $I_l$ of the RLC filter of FIG. 1.

The method of FIG. 5 includes:

a phase 140 for regulating the voltage $U_c$ using the method of FIG. 3, and a phase 142 for regulating the line current $I_l$ using the method of FIG. 4.

The unit 50 switches automatically from the phase 140 to the phase 142 when the measured intensity $I_{li}$ becomes strictly greater than the limit $I_{lmax}$.

Conversely, the unit 50 switches automatically from the phase 142 to the phase 140 when the intensity $I_{li}$ becomes less than the predetermined limit, for example, equal to $I_{lmax}$.

Thus, as long as the measured intensity of the current $I_l$ is strictly less than the limit $I_{lmax}$, the voltage $U_c$ is kept equal at each instant to the voltage setting $U_{cc}$. Oscillations of the setting voltage $U_{cc}$ following a disturbance of the line voltage $U_l$ are therefore limited. If the intensity of the line current $I_l$ exceeds the limit $I_{lmax}$, then the first objective involving regulating the voltage $U_c$ is abandoned and a switchover to the phase 142 takes place. For example, at the phase 142, the line current setting $I_{lc}$ can be chosen to be equal to the limit $I_{lmax}$ or strictly less than the limit $I_{lmax}$. The phase 142 stops as soon as the measured intensity of the line current $I_l$ is less than or equal to the limit $I_{lmax}$ and then a switch back to the phase 140 takes place.

Thus, by alternating the phases 140 and 142 in time, the voltage $U_c$ can be stabilized while maintaining the intensity of the line current $I_l$ less than the limit $I_{lmax}$.

Similarly, the phases 140 and 142 are executed alternately in order to maintain the intensity of the current $I_l$ greater than the limit $I_{lmin}$.

Figure 6:
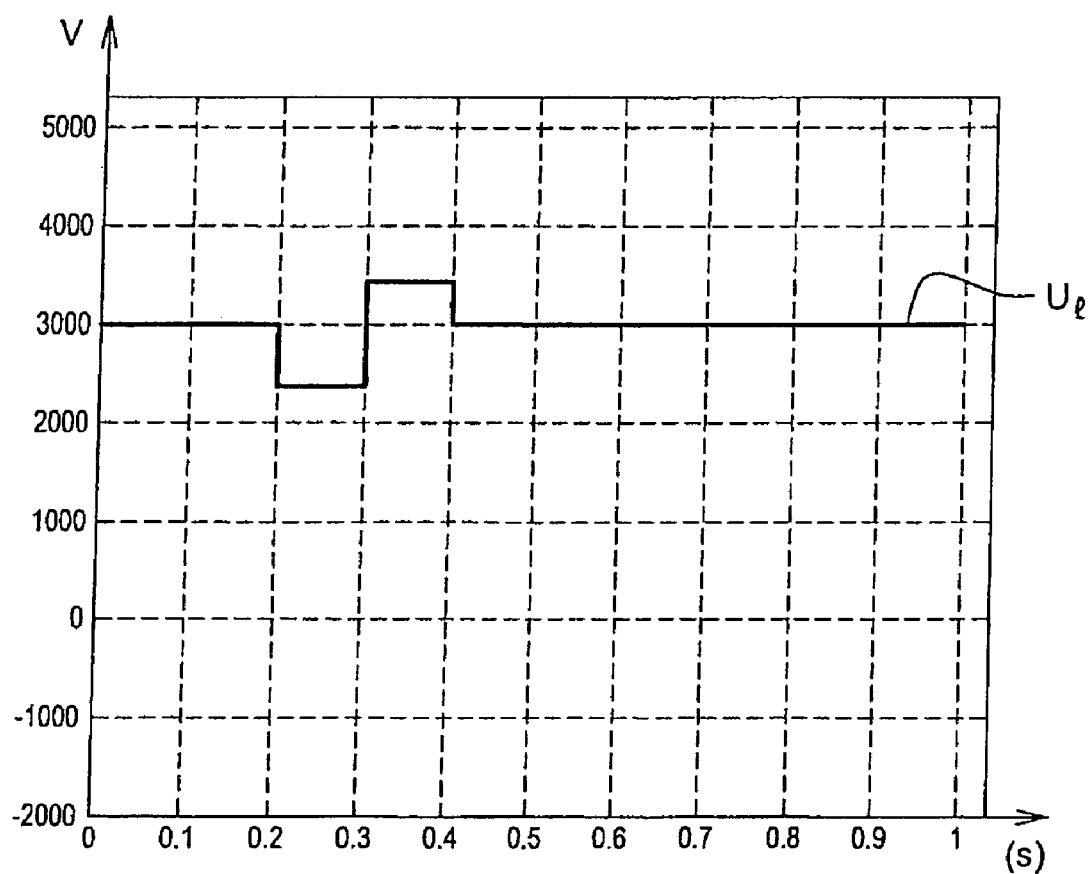
FIG. 6 is an illustration of a disturbance of the line voltage $U_l$.

Operation of the method of FIG. 5 is illustrated for the particular case of a disturbance of the line voltage $U_l$ represented on the graph of FIG. 6. This disturbance involves making the line voltage $U_l$ drop instantaneously from 3000 volts to 2400 volts and maintaining the line voltage $U_l$ equal to 2400 volts for 0.1 seconds. Next, the line voltage $U_l$ rises instantaneously to 3450 volts and remains equal to this value for 0.1 seconds before returning, instantaneously, to 3000 volts. Variations in the line voltage $U_l$ take place instantaneously in this case. It is therefore understood that what is represented in FIG. 6 is only a theoretical disturbance.

Figure 7:
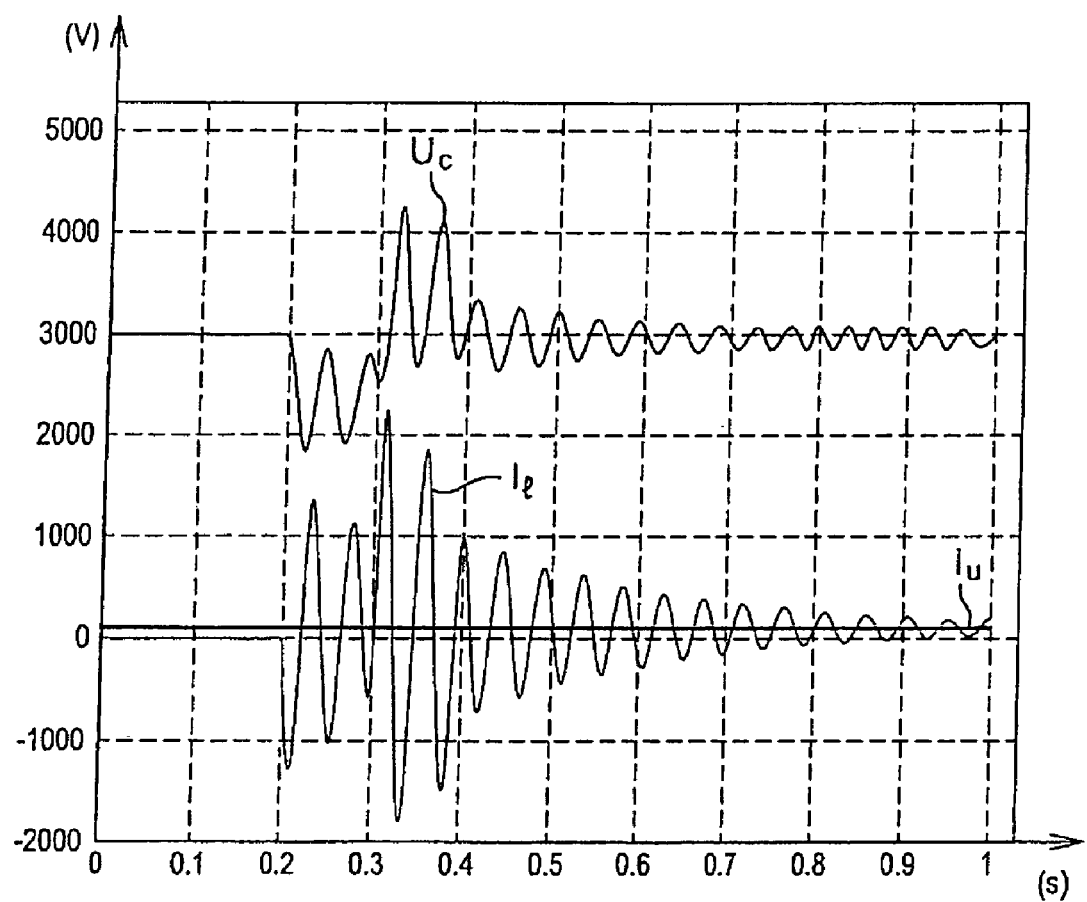
FIG. 7 is a graph illustrating the change over time in the voltage $U_c$, the line current $I_l$, and a current $I_u$, in response to the disturbance represented on the graph of FIG. 6 in the absence of the methods of FIGS. 3 and 4.
Figure 8:
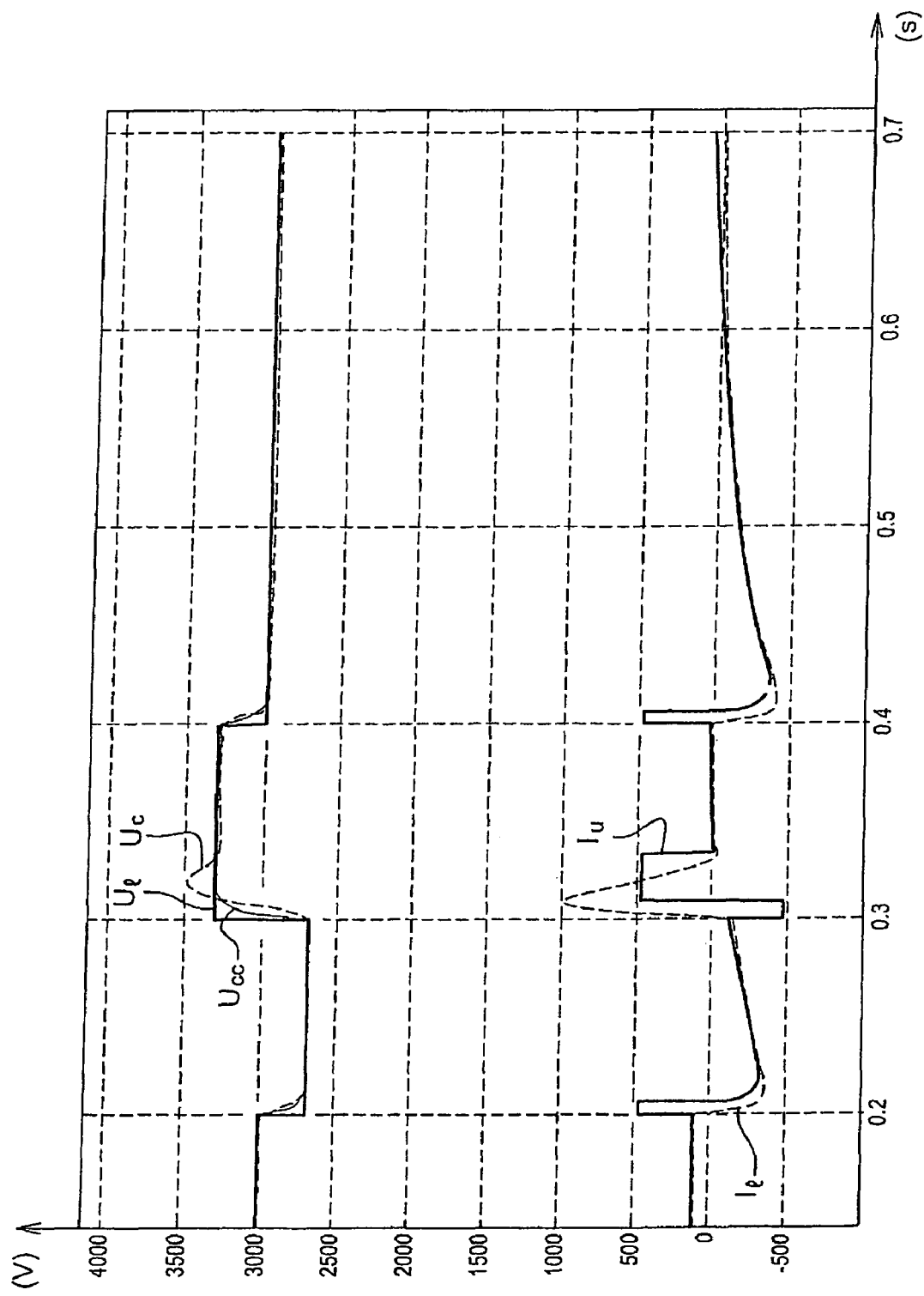
FIG. 8 is a graph representing the change over time of the same quantities as represented in FIG. 7 but for the case in which the regulation method implemented is that of FIG. 5.

The graphs represented in FIGS. 7 and 8 have been obtained from a simulation of a model of the vehicle 2 with the following numeric values:

L=3 mH,
R=25 mΩ,
C=18 mF,
$U_l$=3000 V,
$U_{cmax}$=3500 V,
$I_{umax}$=470 A,
$I_{umin}$=−470 A,
$I_{lmax}$=2000 A,
$R_h$=2Ω.

FIG. 7 represents the change as a function of time of the voltage $U_c$, of the intensity of the line current $I_l$, and of the intensity of the current $I_u$, for the case in which no method for regulating the voltage $U_c$ or the line current $I_l$ is implemented. As can be observed, this results in strong oscillations of the voltage $U_c$ and of the intensity of the line current $I_l$.

With everything else being equal, the graph of FIG. 8 represents the change over time of the voltage $U_c$, and of the intensities of the currents $I_l$ and $I_u$, in response to the disturbance represented in FIG. 6 when the method of FIG. 5 is implemented. Furthermore, the voltage setting $U_{cc}$ is chosen here to be equal to the average of the line voltage $U_l$ over the last ten milliseconds so as to impose sudden variations of this setting which necessarily result in the creation of situations in which the current setting $\bar{I}_{uc}$ reaches the limits of the range [$\bar{I}_{u\ min}, \bar{I}_{u\ max}$]. It will be noted that this choice is made, in this case, only by way of illustration to show what happens when the setting $\bar{I}_{uc}$ reaches one of the limits $\bar{I}_{u\ min}$ or $\bar{I}_{u\ max}$. In practice, the voltage setting $U_{cc}$ will be chosen in such a way as to smooth out the disturbances of the line voltage $U_l$ as indicated with reference to the step 82.

As illustrated on the graph of FIG. 8, the voltage $U_c$ is maintained close to the voltage setting $U_{cc}$. It is therefore understood that using this method, variations in the voltage $U_c$ are very well controlled even in the event of sudden variations of the line voltage $U_l$.

Furthermore, as illustrated by the plateaus in the graph representing the change in the current $I_u$ as a function of time, the limits $\bar{I}_{u\ max}$ and $\bar{I}_{u\ min}$ are reached so that during these plateaus, the voltage $U_c$ is not strictly equal to the voltage setting $U_{cc}$. On the other hand, outside these plateaus, the voltage $U_c$ is equal to the voltage setting $U_{cc}$.

Thus, as FIG. 8 illustrates, by virtue of the method of FIG. 5, variations in the voltage $U_c$ are controlled while maintaining the intensities $I_u$ and $I_l$ within their respective operating ranges.

Many other embodiments are possible.

For example, the conductor 26 of the DC bus can be connected to the pantograph 4 via a rectifier such as a diode bridge rectifier and via a transformer in the case of a catenary supplied by an alternating single-phase voltage.

One from among the line current intensity $I_l$ and the voltage $U_c$ can be estimated instead of being measured. The intensity of the line current $I_l$ and the voltage $U_c$ can also both be estimated.

The above-described applies also to the case of DC motors. In that case, the converter 20 is, for example, a chopper/downconverter.

Lastly, it will be noted that technical constraints can require the use of an approximation $\hat{I}_{uc}$ of the current setting $\bar{I}_{uc}$ and not the exact value given by the relationship (10) or (15). For example, one of these technical constraints is the number of digits after the decimal point that the computer 54 can generate. Thus, in this description, it is considered that from a practical point of view, a current setting $\hat{I}_{uc}$ is established from the system of state equations defined by the relationships (7) and (8) if the following intercorrelation coefficient α is greater than 0.9:

$$\alpha = \frac{1}{NT} \int_0^{NT} \frac{\bar{I}_{uc}(t)\hat{I}_{uc}(t)}{\sqrt{\bar{I}_{uceff}\hat{I}_{uceff}}} dt \qquad (16)$$

where:

N is a whole number, greater than 20, of intervals T taken into account to calculate the intercorrelation coefficient α, $\bar{I}_{uc}(t)$ is the exact value of the setting for the average intensity of the current $I_u$, obtained from the relationship (10) or (15), $\hat{I}_{uc}(t)$ is the approximation of the setting $\bar{I}_{uc}(t)$ sent by the computer 54 to the unit 56, $\bar{I}_{uceff}$ is defined by the following relationship:

$$\bar{I}_{uceff} = \frac{1}{NT}\int_0^{NT} \bar{I}_{uc}^2(t)dt \quad (17)$$

$\hat{I}_{uceff}$ is defined by the following relationship:

$$\hat{I}_{uceff} = \frac{1}{NT}\int_0^{NT} \hat{I}_{uc}^2(t)dt \quad (18)$$

As defined above, the intercorrelation coefficient α represents the degree of correlation between the approximation $\hat{I}_{uc}$ and the exact current setting $\bar{I}_{uc}$.

Preferably, if approximations must be made, they will be produced in such a way that the intercorrelation coefficient α defined above is even greater than 0.7 or 0.99.

Establishing Discretized State Equations for the Filter 30

I

Electrotechnical Model of the Line Filter

I-1—System of Differential Equations for the RLC Filter $$U_l - U_c = L \cdot \frac{dI_l}{dt} + R \cdot I_l$$

$$I_l - I_u = C \cdot \frac{dU_c}{dt}$$

I-2—System of State Equations

The filter is a second-order system, and it therefore has two degrees of freedom. The state vector is therefore a vector with two dimensions. The line current and the voltage of the capacitor can be chosen to be the two coordinates of the state vector of the filter:

$$\vec{X}(t) = \begin{bmatrix} I_l(t) \\ U_c(t) \end{bmatrix}$$

These two variables are measured and are therefore known. If this were not the case, it would be necessary to estimate one of them or observe it.

The control variables of the system are the usage current and the line voltage. Since the line voltage cannot be modified directly, it features in the model as a control variable that is measured and not calculated.

$$\vec{V} = \begin{bmatrix} I_u \\ U_l \end{bmatrix}$$

The system of state equations thus defined can be expressed from the following differential equations:

$$\frac{dI_l}{dt} = -\frac{R}{L} \cdot I_l - \frac{1}{L} \cdot U_c + \frac{1}{L} \cdot U_l$$

$$\frac{dU_c}{dt} = \frac{1}{C} \cdot I_l - \frac{1}{C} \cdot I_u$$

The continuous-time state equation is hence deduced:

$$\begin{bmatrix} \frac{dI_l}{dt} \\ \frac{dU_c}{dt} \end{bmatrix} = \begin{bmatrix} -\frac{R}{L} & -\frac{1}{L} \\ \frac{1}{C} & 0 \end{bmatrix} \cdot \begin{bmatrix} I_l \\ U_c \end{bmatrix} + \begin{bmatrix} 0 & \frac{1}{L} \\ -\frac{1}{C} & 0 \end{bmatrix} \cdot \begin{bmatrix} I_u \\ U_l \end{bmatrix}$$

By comparing with the system of equations of the continuous-time form:

$$\dot{\vec{X}} = A \cdot \vec{X} + B \cdot \vec{V}$$

$$\vec{Y} = E \cdot \vec{X}$$

this gives:

$$\dot{\vec{X}} = \begin{bmatrix} -\frac{R}{L} & -\frac{1}{L} \\ \frac{1}{C} & 0 \end{bmatrix} \cdot \vec{X} + \begin{bmatrix} 0 & \frac{1}{L} \\ -\frac{1}{C} & 0 \end{bmatrix} \cdot \vec{V}$$

$$\vec{Y} = E \cdot \vec{X}$$

Furthermore, given that the measurement vector is the state vector:

$$A = \begin{bmatrix} -\frac{R}{L} & -\frac{1}{L} \\ \frac{1}{C} & 0 \end{bmatrix} B = \begin{bmatrix} 0 & \frac{1}{L} \\ -\frac{1}{C} & 0 \end{bmatrix} E = I_2$$

where:
- $I_2$ is the unit matrix of dimension 2,
- A is the free evolution matrix, and
- B is the control matrix.

II

Diagonalization of the Evolution Matrix

II-1—Characteristic Equation of the Evolution Matrix

The determinant of the matrix is: $\mu \cdot I - A$, equal to 0: therefore:

$$\det \begin{bmatrix} \mu + \frac{R}{L} & \frac{1}{L} \\ -\frac{1}{C} & \mu \end{bmatrix} = 0$$

$$\mu \cdot \left(\mu + \frac{R}{L}\right) + \frac{1}{L \cdot C} = 0$$

$$\mu^2 + \mu \cdot \frac{R}{L} + \frac{1}{L \cdot C} = 0$$

II-2—Eigenvalues of the Evolution Matrix

These are the roots of the characteristic equation:

$$\mu_1 = \frac{-R \cdot C + \sqrt{R^2 \cdot C^2 - 4 \cdot L \cdot C}}{2 \cdot L \cdot C}$$

$$\mu_2 = \frac{-R \cdot C - \sqrt{R^2 \cdot C^2 - 4 \cdot L \cdot C}}{2 \cdot L \cdot C}$$

It is interesting to note that these eigenvalues are constant insofar as the inductance does not vary with the current, and that they are dependent on the current otherwise.

These roots verify the characteristic equation:

$$\mu_1 \cdot \left(\mu_1 + \frac{R}{L}\right) = \mu_2 \cdot \left(\mu_2 + \frac{R}{L}\right) = -\frac{1}{L \cdot C}$$

which can be rewritten thus:

$$\left(\mu_i + \frac{R}{L}\right) \cdot \mu_i + \frac{1}{L \cdot C} = 0$$

The characteristic equation also provides the sum and product of the eigenvalues as notable relationships:

$$\mu_1 + \mu_2 = -\frac{R}{L}$$

$$\mu_1 \cdot \mu_2 = \frac{1}{L \cdot C}$$

It can also be noted that the double root $\mu_1 = \mu_2$ is obtained for:

$$R = 2 \cdot \sqrt{\frac{L}{C}}$$

which is the critical damping resistance.

If $R=0$, $\mu_i = \pm i \cdot \omega$, where:

$$\omega = \frac{1}{\sqrt{L \cdot C}}.$$

The complex conjugate poles are recognized. If $R \neq 0$, the poles are complex conjugates with a negative real part and if the resistance is large enough, above the critical damping value, the poles are real and negative.

II-3—Eigenvectors of the Evolution Matrix

These are calculated by:

$$(\mu_i \cdot I - A) \cdot \prod_i = 0$$

$$\begin{bmatrix} \mu_i + \frac{R}{L} & \frac{1}{L} \\ -\frac{1}{C} & \mu_i \end{bmatrix} \cdot \begin{bmatrix} \pi_{1i} \\ \pi_{2i} \end{bmatrix} = 0$$

i.e.:

The product of the matrices is then expressed as a system of equations:

$$\left(\mu_i + \frac{R}{L}\right) \cdot \pi_{1i} + \frac{1}{L} \cdot \pi_{2i} = 0$$

$$-\frac{1}{C} \cdot \pi_{1i} + \mu_i \cdot \pi_{2i} = 0$$

From the second equation of the system, the following is deduced:

$$\pi_{1i} = \mu_i \cdot C \cdot \pi_{2i}$$

and this relationship enables the first equation to be rewritten thus:

$$\left[\left(\mu_i + \frac{R}{L}\right) \cdot \mu_i + \frac{1}{L \cdot C}\right] \cdot \pi_{2i} = 0$$

This equation is always verified for the two eigenvalues, regardless of the value of $\pi_{2i} \neq 0$, due to the fact that the first factor is in an identical manner zero according to the characteristic equation.

Therefore let $\pi_{21} = -1$ and $\pi_{22} = 1$. The following is hence deduced:

$$\pi_{1i} = \mu_i \cdot C \text{ and } \pi_{12} = \mu_2 \cdot C.$$

The transformation matrix is formed by the eigenvectors:

$$P = \begin{bmatrix} \pi_{11} & \pi_{12} \\ \pi_{21} & \pi_{22} \end{bmatrix}$$

i.e.:

$$P = \begin{bmatrix} -\mu_1 \cdot C & \mu_2 \cdot C \\ -1 & 1 \end{bmatrix}$$

The inverse of the transformation matrix is:

$$P^{-1} = \frac{1}{(\mu_2 - \mu_1) \cdot C} \cdot \begin{bmatrix} 1 & -\mu_2 \cdot C \\ 1 & -\mu_1 \cdot C \end{bmatrix}$$

II-4—Diagonal Matrix

We can now write:

$$A = P \cdot D^{-1} \cdot P^{-1} \text{ where:}$$

$$D = \begin{bmatrix} \mu_1 & 0 \\ 0 & \mu_2 \end{bmatrix}$$

-continued $$D^{-1} = \begin{bmatrix} \frac{1}{\mu_1} & 0 \\ 0 & \frac{1}{\mu_2} \end{bmatrix}$$

III

Projection of the State Equations

III-1—Discretized State Equations

The discretized state equations are obtained by integration from the initial instant $t_i$, until the end $t_{i+1}$ of the sampling period of duration T:

$$X_{t_{i+1}} = F \cdot X_{t_i} + G \cdot \vec{V}_{t_i \to t_{i+1}}$$

with:

$$F = e^{A \cdot T} \quad G = A^{-1} \cdot (e^{A \cdot T} - I) \cdot B$$

If $X_{t_i}$ represents the state vector at the initial instant, $X_{t_{i+1}}$ then represents the prediction of the state vector. It will now be noted:

$$X_i = X_{t_i} \text{ and } X_p = X_{t_{i+1}}$$

The transformation matrix P and the diagonal matrix of the evolution matrix are used to calculate the transition and control matrices:

$$F = P \cdot e^{D \cdot T} \cdot P^{-1} \quad G = A^{-1} \cdot P \cdot (e^{D \cdot T} - I) P^{-1} \cdot B$$

The system of discretized state equations can then be written:

$$X_p = P \cdot e^{D \cdot T} \cdot P^{-1} \cdot X_i + A^{-1} \cdot P \cdot (e^{D \cdot T} - I) P^{-1} \cdot B \cdot \vec{V}$$

III-2—Projection of the State Vectors

Now it is merely a case of projecting the system of discretized state equations in the base of eigenvectors by premultiplying by the inverse of the transformation matrix, and of isolating the state "eigenvectors".

$$P^{-1} \cdot X_p = e^{D \cdot T} \cdot P^{-1} \cdot X_i + A^{-1} \cdot P \cdot (e^{D \cdot T} - I) \cdot P^{-1} \cdot B \cdot \vec{V}$$

noting that:

$$P^{-1} \cdot A^{-1} \cdot P = (P^{-1} \cdot A \cdot P)^{-1} = D^{-1}$$

the vector relationship is simplified:

$$[P^{-1} \cdot X_p] = e^{D \cdot T} \cdot [P^{-1} \cdot X_i] + D^{-1} \cdot (e^{D \cdot T} - I) \cdot [P^{-1} \cdot B] \cdot \vec{V}$$

To simplify the final representation of the state equation, let us multiply the two members of the equation by the constant: $(\mu_2 - \mu_1) \cdot C$:

$$(\mu_2 - \mu_1) \cdot C \cdot [P^{-1} \cdot X_p] = e^{D \cdot T} \cdot (\mu_2 - \mu_1) \cdot C \cdot [P^{-1} \cdot X_i] + D^{-1} \cdot (e^{D \cdot T} - I) \cdot (\mu_2 - \mu_1) \cdot C \cdot [P^{-1} \cdot B] \cdot \vec{V}$$

The state eigenvectors are defined by:

$$\vec{\Psi} = (\mu_2 - \mu_1) \cdot C \cdot [P^{-1} \cdot \vec{X}]$$

$$\vec{\Psi} = \begin{bmatrix} 1 & -\mu_2 \cdot C \\ 1 & -\mu_1 \cdot C \end{bmatrix} \cdot \vec{X}$$

$$\vec{\Psi} = \begin{bmatrix} 1 & -\mu_2 \cdot C \\ 1 & -\mu_1 \cdot C \end{bmatrix} \cdot \begin{bmatrix} I_l \\ U_c \end{bmatrix}$$

Their coordinates are therefore:

$$\begin{bmatrix} \Psi_1 \\ \Psi_2 \end{bmatrix} = \begin{bmatrix} I_l - \mu_2 \cdot C \cdot U_c \\ I_l - \mu_1 \cdot C \cdot U_c \end{bmatrix}$$

The state matrix-equation can be expressed using this new definition, noting, moreover, that:

$$e^{D \cdot T} = \begin{bmatrix} e^{\mu_1 \cdot T} & 0 \\ 0 & e^{\mu_2 \cdot T} \end{bmatrix}$$

$$\vec{\Psi}_p = e^{D \cdot T} \cdot \vec{\Psi}_i + \begin{bmatrix} \frac{1}{\mu_1} & 0 \\ 0 & \frac{1}{\mu_2} \end{bmatrix} \cdot \begin{bmatrix} e^{\mu_1 \cdot T} - 1 & 0 \\ 0 & e^{\mu_2 \cdot T} - 1 \end{bmatrix} \cdot \begin{bmatrix} 1 & -\mu_2 \cdot C \\ 1 & -\mu_1 \cdot C \end{bmatrix} \cdot \begin{bmatrix} 0 & \frac{1}{L} \\ -\frac{1}{C} & 0 \end{bmatrix} \cdot \begin{bmatrix} T_u \\ \overline{U}_l \end{bmatrix}$$

$$\vec{\Psi}_p = e^{D \cdot T} \cdot \vec{\Psi}_i + \begin{bmatrix} \frac{e^{\mu_1 \cdot T} - 1}{\mu_1} & 0 \\ 0 & \frac{e^{\mu_2 \cdot T} - 1}{\mu_2} \end{bmatrix} \cdot \begin{bmatrix} \mu_2 & \frac{1}{L} \\ \mu_1 & \frac{1}{L} \end{bmatrix} \cdot \begin{bmatrix} T_u \\ \overline{U}_l \end{bmatrix}$$

$$\vec{\Psi}_p = e^{D \cdot T} \cdot \vec{\Psi}_i + \begin{bmatrix} \frac{e^{\mu_1 \cdot T} - 1}{\mu_1} & 0 \\ 0 & \frac{e^{\mu_2 \cdot T} - 1}{\mu_2} \end{bmatrix} \cdot \begin{bmatrix} \mu_2 \cdot \overline{I}_u + \frac{1}{L} \cdot \overline{U}_l \\ \mu_1 \cdot \overline{I}_u + \frac{1}{L} \cdot \overline{U}_l \end{bmatrix}$$

The control "eigenvector" $\vec{\Xi}$ is defined by:

$$\vec{\Xi} = \begin{bmatrix} \mu_2 \cdot \overline{I}_u + \frac{1}{L} \cdot \overline{U}_l \\ \mu_1 \cdot \overline{I}_u + \frac{1}{L} \cdot \overline{U}_l \end{bmatrix}$$

The system of state equations can now be written in a simplified manner:

$$\vec{\Psi}_p = e^{D \cdot T} \cdot \vec{\Psi}_i + \begin{bmatrix} \frac{e^{\mu_1 \cdot T} - 1}{\mu_1} & 0 \\ 0 & \frac{e^{\mu_2 \cdot T} - 1}{\mu_2} \end{bmatrix} \cdot \vec{\Xi}$$

$$\Psi_{1p} = e^{\mu_1 \cdot T} \cdot \Psi_{1i} + \frac{e^{\mu_1 \cdot T} - 1}{\mu_1} \cdot \Xi_1$$

$$\Psi_{2p} = e^{\mu_2 \cdot T} \cdot \Psi_{2i} + \frac{e^{\mu_2 \cdot T} - 1}{\mu_2} \cdot \Xi_2$$

or:
Lastly, by letting:

$$a_1 = \frac{e^{\mu_1 \cdot T} - 1}{\mu_1}$$

$$a_2 = \frac{e^{\mu_2 \cdot T} - 1}{\mu_2}$$

the "characteristic" state equations become:

$$\Psi_{1p} = e^{\mu_1 \cdot T} \cdot \Psi_{1i} + a_1 \cdot \Xi_1$$

$$\Psi_{2p} = e^{\mu_2 \cdot T} \cdot \Psi_{2i} + a_2 \cdot \Xi_2$$

The previous system can now be explained using the definition of intermediate variables:

$$I_{lp} - \mu_2 \cdot C \cdot U_{cp} = e^{\mu_1 \cdot T} \cdot (I_{li} - \mu_2 \cdot C \cdot U_{ci}) + a_1 \cdot \left(\mu_2 \cdot \bar{I}_u + \frac{1}{L} \cdot \bar{U}_l\right)$$

$$I_{lp} - \mu_1 \cdot C \cdot U_{cp} = e^{\mu_2 \cdot T} \cdot (I_{li} - \mu_1 \cdot C \cdot U_{ci}) + a_2 \cdot \left(\mu_1 \cdot \bar{I}_u + \frac{1}{L} \cdot \bar{U}_l\right)$$

What is claimed is:

1. A method for regulating a voltage $U_c$ between a first and a second output point of a low-pass RLC filter of natural period $T_f$, the RLC filter including two input points electrically connected, respectively, to conductors of a DC bus of an electric vehicle powered via a catenary, first and second output points being electrically connected to a controllable electric converter for controlling torque exerted by an electric traction motor of the electric vehicle, stator time constant $\tau$ of the electric traction motor being strictly less than the natural period $T_f$, the method including measuring or estimating the intensity $I_{li}$ of a line current $I_l$ flowing through an inductance of the filter at an instant $t_i$, of a voltage $U_{ci}$ between the first and second output points of the filter at the instant $t_i$, and of a line voltage $U_l$ between the input points of the filter, wherein the method is a deadbeat control method comprising:
calculating a setting $\bar{I}_{uc}$ for an average intensity $\bar{I}_u$ of a DC current $I_u$ flowing through the first output point of the filter between the instant $t_i$ and an instant $t_{i+1}$, the setting $\bar{I}_{uc}$ being established from discretized state equations of the filter in such a way that the voltage $U_c$ is equal to a predetermined voltage setting $U_{cc}$ at the instant $t_{i+1}$, the discretized state equations between them establishing relationships between the intensities and $I_{li}$ to $I_{l,i+1}$ of a line current $I_l$ at the instants $t_i$ and $t_{i+1}$ respectively, the voltages $t_{ci}$ and $U_{c,i+1}$ between the first and second output points of the filter at the instants $t_i$ and $t_{i+1}$ respectively, the average line voltage $\bar{U}_l$ between the instants $t_i$ and $t_{i+1}$ and the average intensity $\bar{I}_u$; and
controlling the electric converter in order to produce a current $I_u$ flowing through the first output point of the filter, the average intensity $\bar{I}_u$ of which between the instants $t_i$ and $t_{i+1}$ is equal to the setting $\bar{I}_{uc}$, the time interval T between the instants $t_i$ and $t_{i+1}$ being strictly less than $5\tau$.

2. The method according to claim 1, wherein the voltage setting $U_{cc}$ is chosen always to be less than or equal to a limit $U_{cmax}$, the limit $U_{cmax}$ corresponding to the maximum allowable voltage at the input of the electric converter or between the output points of the filter.

3. The method according to claim 1, wherein the method includes:
constructing an estimate $I_{lp}$ of the line current $I_l$ which will be reached if the voltage $U_c$ is equal to the voltage setting $U_{cc}$ at the instant $t_{i+1}$;
comparing the estimate $I_{lp}$ with at least one predetermined limit $I_{lm}$;
only if the predetermined limit $I_{lm}$ is crossed, modifying the voltage setting $U_{cc}$ so as to obtain a temporary voltage setting $U_{ccm}$ which corresponds to an estimate $I_{lp}$ that does not cross the predetermined limit $I_{lm}$, and using the temporary voltage setting $U_{ccm}$ in place of the voltage setting $U_{cc}$ during the calculation of the setting $\bar{I}_{uc}$ only for the interval T in progress; and
if the predetermined limit $I_{lm}$ is not crossed, using the voltage setting $U_{cc}$ for calculating the setting $\bar{I}_{uc}$ for the interval T in progress.

4. The method according to claim 1, wherein the setting $\bar{I}_{uc}$ is a solution of the following system of equations:

$$I_{lp} - \mu_2 \cdot C \cdot U_{cc} = e^{\mu_1 \cdot T} \cdot (I_{li} - \mu_2 \cdot C \cdot U_{ci}) + a_1 \cdot \left(\mu_2 \cdot \bar{I}_{uc} + \frac{1}{L} \cdot \bar{U}_l\right)$$

$$I_{lp} - \mu_1 \cdot C \cdot U_{cc} = e^{\mu_2 \cdot T} \cdot (I_{li} - \mu_1 \cdot C \cdot U_{ci}) + a_2 \cdot \left(\mu_1 \cdot \bar{I}_{uc} + \frac{1}{L} \cdot \bar{U}_l\right)$$

where:
R and L are the values of the resistance and the inductance, respectively, of the RLC filter, and which are connected in series between the first input and output points;
C is the capacitance of the capacitor connected between the first and second output points;
$\mu_1$ and $\mu_2$ are the eigenvalues of an evolution matrix and are defined by the following relationships:

$$\mu_1 = \frac{-R \cdot C + \sqrt{R^2 \cdot C^2 - 4 \cdot L \cdot C}}{2 \cdot L \cdot C}$$

$$\mu_2 = \frac{-R \cdot C - \sqrt{R^2 \cdot C^2 - 4 \cdot L \cdot C}}{2 \cdot L \cdot C}; \text{ and}$$

$a_1$ and $a_2$ are values defined by the following relationships:

$$a_1 = \frac{e^{\mu_1 \cdot T} - 1}{\mu_1}$$

$$a_2 = \frac{e^{\mu_2 \cdot T} - 1}{\mu_2}.$$

5. The method according to claim 1, wherein the voltage setting $U_{cc}$ is constructed from the line voltage $U_l$ in such a way that its power spectrum does not exhibit any harmonic beyond the frequency $0.9/T_f$.

6. The method according to claim 1, wherein the method includes controlling a rheostat in order to produce, in combination with the control of the converter, the current $I_u$ flowing through the first output terminal of the filter, the average intensity $\bar{I}_u$ of which between the instants $t_i$ and $t_{i+1}$ is equal to the current setting $\bar{I}_{uc}$.

7. The method according to claim 1, wherein the interval T is less than or equal to $\tau/5$.

8. An information recording medium comprising instructions for executing a method as recited in claim 1 when these instructions are executed by an electronic computer.

9. A method for regulating a line current $I_l$ flowing through an inductance L of a low-pass RLC filter of natural period $T_f$, this filter including:

two input points electrically connected, respectively, to the conductors of a DC bus of an electric vehicle powered via a catenary; and first and second output points, the first output point being electrically connected to a controllable electric converter in order to cause the torque of an electric traction motor of the electric vehicle to vary, the stator time constant τ of this electric motor being strictly less than the natural period $T_f$, the method including:

measuring or estimating of the intensity $I_{li}$ of the line current $I_l$ at an instant $t_i$, of a voltage $U_{ci}$ between the output points of the filter at the instant $t_i$, and of a line voltage $U_l$ between the input points of the filter, wherein the method is a deadbeat control method including:

calculating a setting $\bar{I}_{uc}$ for the average intensity $\bar{I}_u$ of a DC current $I_u$ flowing through the first output point of the filter between the instant $t_i$ and an instant $t_{i+1}$, the setting $\bar{I}_{uc}$ being established from discretized state equations of the filter in such a way that the intensity of the line current $I_l$ is equal to a predetermined line current setting $T_{lc}$ at the instant $t_{i+1}$, the discretized state equations between them establishing relationships between the intensities $I_{li}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\bar{U}_l$ between the instants $t_i$ and $t_{i+1}$ and the average intensity $\bar{I}_u$; and controlling the electric converter to produce a current $I_u$ flowing through the output point, the average intensity $\bar{I}_u$ of which between the instants $t_i$ and $t_{i+1}$ is equal to the setting $\bar{I}_{uc}$, the time interval T between the instants $t_i$ and $t_{i+1}$ being strictly less than 5τ.

10. The method according to claim 9, wherein the line current setting $I_{lc}$ is chosen always to be less than or equal to a limit $I_{lmax}$, the limit $I_{lmax}$ corresponding to the intensity of the line current $I_l$ at which a circuit-breaker of a power substation of the catenary or of the electric vehicle is tripped.

11. The method according to claim 9, wherein the line current setting $I_{lc}$ is chosen always to be greater than or equal to a limit $I_{lmin}$, the limit $I_{lmin}$ corresponding to the intensity of the line current below which the inductance L of the filter is desaturated.

12. The method according to claim 9, wherein the method includes:

constructing an estimate $U_{cp}$ of the voltage $U_c$ which will be reached between the output points of the filter at the instant $t_{i+1}$ if the intensity of the line current $I_l$ is equal to the line current setting $I_{lc}$ at the instant $t_{i+1}$;

comparing the voltage estimate $U_{cp}$ with at least one predetermined voltage limit $U_{cm}$;

only if the predetermined voltage limit $U_{cm}$ is crossed, modifying the line current setting $I_{lc}$ so as to obtain a temporary line current setting $I_{lcm}$ which corresponds to a voltage estimate $U_{cp}$ that does not cross the predetermined voltage limit $U_{cm}$, and using the temporary line current setting $I_{lcm}$ in place of the line current setting $I_{lc}$ during the control of the converter only over the interval T in progress; and if the predetermined voltage limit $U_{cm}$ is not crossed, using the line current setting $I_{lc}$ during the calculation of the current setting $\bar{I}_{uc}$ for the interval T in progress.

13. The method according to claim 9, wherein the current setting $\bar{I}_{uc}$ is a solution of the following system of equations:

$$I_{lc} - \mu_2 \cdot C \cdot U_{cp} = e^{\mu_1 \cdot T} \cdot (I_{li} - \mu_2 \cdot C \cdot U_{ci}) + a_1 \cdot \left(\mu_2 \cdot \bar{I}_{uc} + \frac{1}{L} \cdot \bar{U}_l\right)$$

$$I_{lc} - \mu_1 \cdot C \cdot U_{cp} = e^{\mu_2 \cdot T} \cdot (I_{li} - \mu_1 \cdot C \cdot U_{ci}) + a_2 \cdot \left(\mu_1 \cdot \bar{I}_{uc} + \frac{1}{L} \cdot \bar{U}_l\right)$$

where:

R and L are the values of the resistance and the inductance, respectively, of the RLC filter, and which are connected in series between the first input and output points;

C is the capacitance of the capacitor connected between the first and second output points;

$\mu_1$ and $\mu_2$ are the eigenvalues of an evolution matrix and are defined by the following relationships:

$$\mu_1 = \frac{-R \cdot C + \sqrt{R^2 \cdot C^2 - 4 \cdot L \cdot C}}{2 \cdot L \cdot C}$$

$$\mu_2 = \frac{-R \cdot C - \sqrt{R^2 \cdot C^2 - 4 \cdot L \cdot C}}{2 \cdot L \cdot C}; \text{ and}$$

$a_1$ and $a_2$ are values defined by the following relationships:

$$a_1 = \frac{e^{\mu_1 \cdot T} - 1}{\mu_1}$$

$$a_2 = \frac{e^{\mu_2 \cdot T} - 1}{\mu_2}.$$

14. A method comprising:

a first phase for regulating only a voltage $U_c$ between first and second output points of a low-pass RLC filter of natural period $T_f$, the RLC filter including two input points electrically connected, respectively, to conductors of a DC bus of an electric vehicle powered via a catenary, first and second output points being electrically connected to a controllable electric converter for controlling torque exerted by an electric traction motor of the electric vehicle, stator time constant τ of the electric traction motor being strictly less than the natural period $T_f$, the first phase method including measuring or estimating the intensity $I_{li}$ of a line current $I_l$ flowing through an inductance of the filter at an instant $t_i$, of a voltage $U_{ci}$ between the first and second output points of the filter at the instant $t_i$, and of a line voltage $U_l$ between the input points of the filter, wherein the first phase method is a deadbeat control method comprising:

calculating a setting $\bar{I}_{uc}$ for an average intensity $\bar{I}_u$ of a DC current $I_u$ flowing through the first output point of the filter between the instant $t_i$ and an instant $t_{i+1}$, the setting $\bar{I}_{uc}$ being established from discretized state equations of the filter in such a way that the voltage $U_c$ is equal to a predetermined voltage setting $U_{cc}$ at the instant $t_{i+1}$, the discretized state equations between them establishing relationships between the intensities $I_{l,i}$ and $I_{l,i+1}$ of a line current $I_l$ at the instants $t_i$ and $t_{i+1}$ respectively, the voltages $U_{ci}$ and $U_{c,i+1}$ between the first and second output points of the filter at the instants $t_i$ and $t_{i+1}$ respectively, the average line voltage $\overline{U}_l$ between the instants $t_i$ and $t_{i+1}$ and the average intensity $\overline{I}_u$;

controlling the electric converter in order to produce a current $I_u$ flowing through the first output point of the filter, the average intensity $\overline{I}_u$ of which between the instants $t_i$ and $t_{i+1}$ is equal to the setting $\overline{I}_{uc}$, the time interval T between the instants $t_i$ and $t_{i+1}$ being strictly less than $5\tau$;

a second phase for regulating only the intensity of the line current $I_l$ in accordance with claim 9; and switchover from the first phase to the second phase as soon as the intensity of the line current $I_l$ crosses a limit $I_{lm}$ and switchover from the second phase to the first phase as soon as the intensity of the line current $I_l$ crosses the same or another limit in the opposite direction.

15. An electric vehicle including:

a DC bus formed by two conductors;

at least one traction motor of the electric vehicle having a stator time constant $\tau$;

a controllable electric converter intended to cause the torque of the traction motor to vary;

a low-pass RLC filter including two input points electrically connected, respectively, to the two conductors of the DC bus, and first and second output points electrically connected to the electric converter;

sensors or estimators intended to measure or estimate the intensity $I_{li}$ of a line current $I_l$ flowing through the inductance of the filter at the instant $t_i$, a voltage $U_{ci}$ between the output points of the filter at the instant $t_i$, and a line voltage $U_l$ between the input points of the filter;

a computer for calculating a current setting $\overline{I}_{uc}$ for the average intensity $\overline{I}_u$ of a DC current $I_u$ flowing through the first output point between the instant $t_i$ and an instant $t_{i+1}$, this current setting $\overline{I}_{uc}$ being established from discretized state equations of the filter in such a way that the voltage $U_c$ is equal to a predetermined voltage setting $U_{cc}$ at the instant $t_{i+1}$, the discretized state equations between them establishing relationships between the intensities $I_{l,i}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\overline{U}_l$ between the instants $t_i$ and $t_{i+1}$ and the average intensity $\overline{I}_u$; and a control unit for controlling the electric converter in order to produce a current $I_u$ flowing through the output point of the filter, the average intensity $\overline{I}_u$ of which between the instants $t_i$ and $t_{i+1}$ is equal to the setting $\overline{I}_{uc}$, the time interval T between the instants $t_i$ and $t_{i+1}$ being strictly less than $5\tau$.

16. An electric vehicle including:

a DC bus formed by two conductors;

at least one traction motor of the electric vehicle having a stator time constant $\tau$;

a controllable electric converter intended to cause the torque of the traction motor to vary;

a low-pass RLC filter including two input points electrically connected, respectively, to the two conductors of the DC bus, and first and second output points electrically connected to the electric converter;

sensors or estimators intended to measure or estimate the intensity $I_{li}$ of a line current $I_l$ flowing through the inductance (L) of the filter at the instant $t_i$, a voltage $U_{ci}$ between the output points of the filter at the instant $t_i$, a voltage $U_l$ between the input points of the filter;

a computer for calculating a current setting $\overline{I}_{uc}$ for the average intensity $\overline{I}_u$ of a DC current $I_u$ flowing through the first output point of the filter between the instant t; and an instant $t_{i+1}$, this current setting $\overline{I}_{uc}$ being established from discretized state equations of the filter in such a way that the intensity of the line current $I_l$ is equal to a predetermined line current setting $I_{lc}$ at the instant $t_{i+1}$, these discretized state equations between them establishing relationships between the intensities and $I_{li}$ and $I_{l,i+1}$ of the line current $I_l$ at the instants $t_i$ and $t_{i+1}$ respectively, the voltages $U_{ci}$ and $U_{c,i+1}$ between the output points of the filter at the instants $t_i$ and $t_{i+1}$ respectively, the average line voltage $\overline{U}_l$ between the instants $t_i$ and $t_{i+1}$ and the average intensity $\overline{I}_u$; and a control unit for controlling the electric converter in order to produce a current $I_u$ flowing through the output point of the filter, the average intensity $\overline{I}_u$ of which between the instants $t_i$ and $t_{i+1}$ is equal to the current setting $\overline{I}_{uc}$, the time interval T between the instants $t_i$ and $t_{i+1}$ being strictly less than $5\tau$.

* * * * *